(12) United States Patent
Kitagawa

(10) Patent No.: US 8,682,194 B2
(45) Date of Patent: Mar. 25, 2014

(54) MANAGING PERIPHERAL DEVICES USING DISPLAY A SCREEN

(75) Inventor: Kan Kitagawa, Odawara (JP)

(73) Assignee: Canon Kabushiki Kaisha, Tokyo (JP)

(*) Notice: Subject to any disclaimer, the term of this patent is extended or adjusted under 35 U.S.C. 154(b) by 15 days.

(21) Appl. No.: 13/418,790

(22) Filed: Mar. 13, 2012

(65) Prior Publication Data

US 2012/0250085 A1    Oct. 4, 2012

(30) Foreign Application Priority Data

Mar. 30, 2011   (JP) ................. 2011-075375

(51) Int. Cl.
*G03G 15/00* (2006.01)
*G06F 3/12* (2006.01)

(52) U.S. Cl.
USPC ............................ 399/81; 358/1.15

(58) Field of Classification Search
USPC ............................ 358/1.15; 399/81
See application file for complete search history.

(56) References Cited

U.S. PATENT DOCUMENTS

2006/0187483 A1* 8/2006 Baba ........................... 358/1.15

FOREIGN PATENT DOCUMENTS

JP    2011014026 A    1/2011

* cited by examiner

*Primary Examiner* — Eric A Rust
(74) *Attorney, Agent, or Firm* — Canon USA, Inc., IP Division

(57) ABSTRACT

An information processing apparatus for displaying a peripheral device management screen to manage a peripheral device includes a storage unit, a management screen forming unit, an installation determination unit, a display determination unit, and a display control unit. The storage unit stores peripheral device management information that defines information to instruct execution of processing relating to the peripheral device from the peripheral device management screen. The management screen forming unit determines a configuration and a content of the peripheral device management screen based on the defined information. The installation determination unit determines whether to install the peripheral device management information. The display determination unit determines whether to automatically display the peripheral device management screen in response to the peripheral device management information being installed based on an installation determination result. The display control unit executes control to display the peripheral device management screen based on a display determination result.

8 Claims, 19 Drawing Sheets

FIG.7

```
<?xml version="1.0" encoding="utf-8"?>
<dm:OperatingSystemInfo xmlns:dm="http://abc.xxx/dm/control">                            ~811
    <dm:LaunchDeviceManagementAfterInstallation>true</dm:LaunchDeviceManagementAfterInstallation>
</dm:OperatingSystemInfo xmlns:dm="http://abc.xxx/dm/control">
<dm:PackageInfo xmlns:dm="http://abc.xxx/dm/control">
    <dm:LastModifiedDate>2011-01-01T00:00:00z</dm:LastModifiedDate>~812
</dm:PackageInfo xmlns:dm="http://abc.xxx/dm/control">
<dm:DeviceCategory>Printer</dm:DeviceCategory>~813
<dm:deviceManagement xmlns:dm="http://abc.xxx/dm/control">
    <dm:manufacturer>ABC</dm:manufacturer>~801
    <dm:model>Kmmn</dm:model>~802
    <dm:deviceId>MFG:ABC;MDL:Kmmn;CLS:PRINTER;CMD:P4;DES:ABC Kmmn;</dm:deviceId> ~803
    <dm:functions>~804
        <dm:function>~805
            <dm:name xml:lang="en-US">Open Printer Queue</dm:name>~806
            <dm:execute>openPrinterQueue</dm:execute>~807
        </dm:function>
        <dm:function>~808
            <dm:name xml:lang="en-US">Printing Preferences</dm:name>~809
            <dm:execute>printingPreferences</dm:execute>~810
        </dm:function>
    </dm:functions>
</dm:deviceManagement>
```

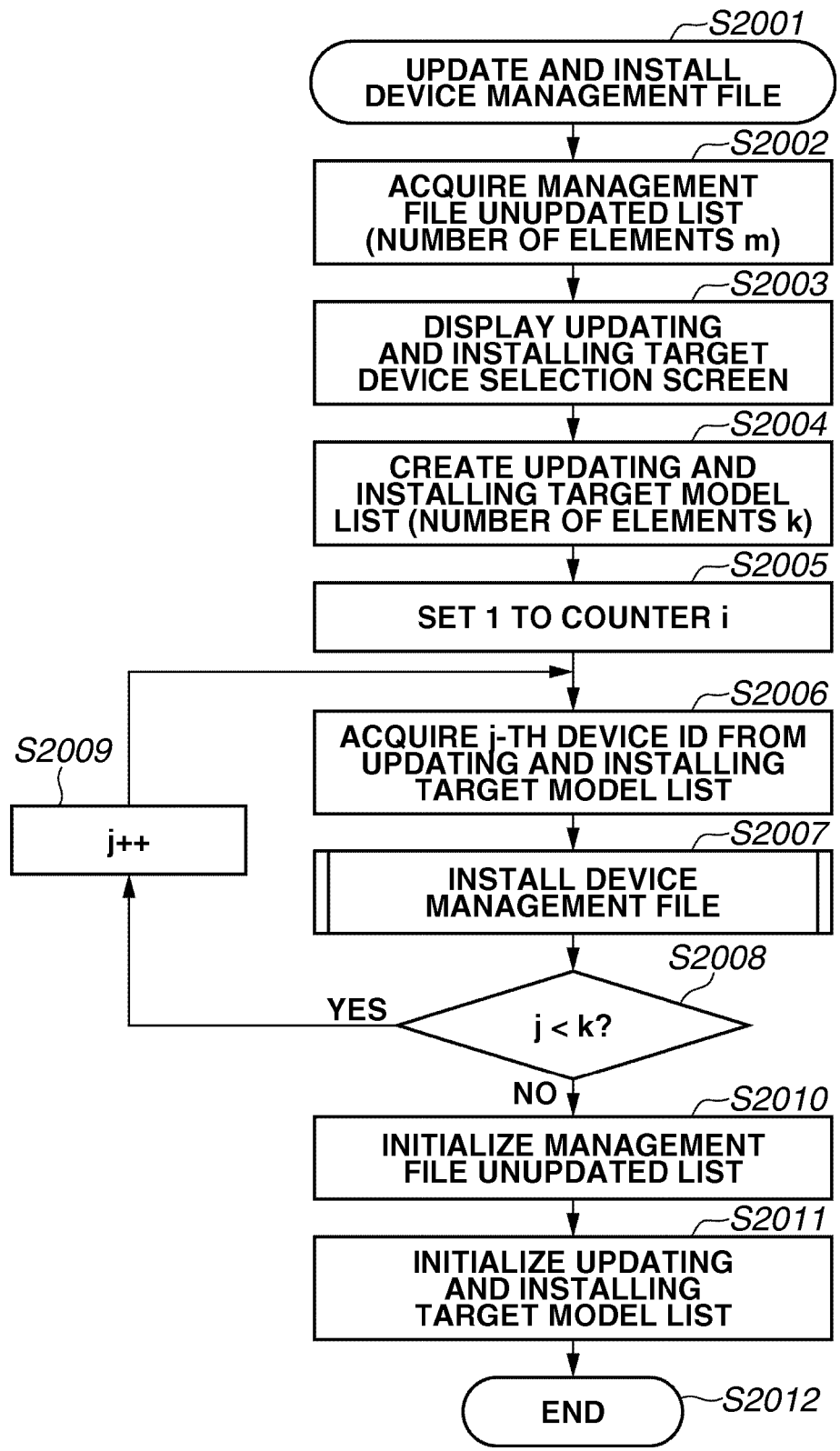

MANAGING PERIPHERAL DEVICES USING DISPLAY A SCREEN

BACKGROUND OF THE INVENTION

1. Field of the Invention

The present invention relates to a peripheral device control system that includes an information processing apparatus and a peripheral device.

2. Description of the Related Art

In recent years, a peripheral device control system having a peripheral device connected to an information processing apparatus has been effectively utilized in various forms at home or in office through the use of a variety of interfaces such as a universal serial bus (USB), Ethernet (registered trademark) and a wireless local area network (LAN). Examples of peripheral devices are a printer, a copying machine, a facsimile (hereinafter, FAX), a scanner, a digital camera, a digital video camera, and a multifunction peripheral of these devices.

In Windows 7 (registered trademark) by Microsoft Corporation of U.S., a new function for managing a peripheral device connected to an information processing apparatus such as a personal computer (hereinafter referred to as PC) has been introduced. It is a Device Stage that has a link function to a Devices and Printers folder serving as a window to display devices connected to the PC and applications and services unique to each peripheral device. The "Device and Stage" is a trademark of Microsoft Corporation of U.S. A screen (FIG. 6A) of the Devices and Printers folder can be displayed from a "start menu" of the Windows. A Device Stage™ screen (FIG. 6B) of each peripheral device can also be opened from the Devices and Printers folder.

The Devices Stage™ can provide a visual screen, enabling a user to easily access functions or services relating to the device. An example of a peripheral device is a printer. For example, a function of displaying a list of documents to be printed or a property screen of the printer can be provided on the Device Stage™ screen. In this example, information of the peripheral device (printer) can be checked by activating a print queue or the property screen of the printer from the Device Stage™ screen.

Along with popularization of the Internet, various on-line services connecting the information processing apparatus or the peripheral device to the Internet to use the Internet have been provided. For example, setting a link of a support site provided by a maker in the Internet on the Device Stage™ screen enables the user to easily access a site relating to the device.

A content of the Device Stage™ is metadata containing only a file of an Extensible Markup Language (XML) format or a resource file of an image or an icon. By customizing the metadata, namely, the XML file, the image file, or the icon file for each peripheral device, display or a function of the Device Stage™ for each peripheral device can be customized.

Control of an operation is described in the XML file. However, the XML file cannot have any function or variable similar to that mounted on software such as a general program because it is a static text file. For some pieces of information supported by an operating system (OS), however, variables usable in the XML file are prepared. For example, a variable for a printer name driver (friendly name) allocated to a printer queue or a viable for a Windows Image ACQUISITION (WIA) driver name allocated to a WIA driver for a scanner function using a WIA is provided from the OS.

Further, processing can be controlled under conditions of a path of registry, a content of information in the registry, and architecture of a processor. The XML file contains information unique to each peripheral device. This information associates each peripheral device with metadata for each peripheral device. The metadata is stored in a web server or a compact disk read-only memory (CD-ROM). The PC acquires the metadata from such a medium. In an exemplary embodiment, the Device Stage™, the meta data, and the XML file may respectively be referred to as a device management screen, device management information or a device management file, and device management control information or a device management control file.

As an example of a peripheral device, a multifunction printer (hereinafter, MFP) including a printer, a FAX, a scanner, and a storage is described. Conventionally, when the MFP is connected to a PC including the Windows 7, and this PC is connected to the Internet, Device Stage™ metadata (hereinafter referred to as metadata) for the MFP is installed in the PC through the following procedure.

(1-1) The PC acquires information (hardware ID) unique to the MFP.

(1-2) The PC checks whether metadata containing an XML file in which the unique information acquired in (1-1) is written is present in a web server or a CD-ROM for storing metadata (hereinafter, it is presumed that the metadata is present).

(1-3) The metadata for the MFP is downloaded from the web server or the CD-ROM to the PC.

(1-4) The downloaded metadata is installed in the PC. In an environment where the metadata for the MFP has already been installed in the PC through the process of (1-1) to (1-4), when presence of new metadata for the MFP is confirmed in the web server or the CD-ROM, this new metadata is installed in the PC through the following procedure.

(2-1) The PC acquires information (hardware ID) unique to the MFP.

(2-2) The PC checks whether metadata containing an XML file in which the unique information acquired in (2-1) is written is present in the web server or the CD-ROM for storing metadata (hereinafter, it is presumed that the metadata is present).

(2-3) With respect to the metadata installed in the PC and the metadata present in the web server or the CD-ROM, date information written in XML files contained in the metadata is compared with each other (hereinafter, it is presumed that the metadata present in the web server is newer).

(2-4) At the time of activating the Devices and Printers folder, notification indicating installation permission of new metadata is displayed on the screen of the folder (hereinafter, it is presumed that installation has been executed according to a content of the notification). Even when metadata for a plurality of peripheral devices can be installed, no name of a target device is displayed in the notification.

(2-5) The new metadata for the MFP is downloaded from the web server or the CD-ROM to the PC.

(2-6) The downloaded metadata is installed in the PC. A conventional example of managing information unique to each peripheral device by metadata is a technology discussed in Japanese Patent Application Laid-Open No. 2011-14026.

When the metadata for the MFP is installed in the PC, if a design of an icon file contained in the metadata is different from that of an icon file which has been used to display the MFP on the screen of the Devices and Printers folder, whether following the procedures of (1-1) to (1-4) or (2-1) to (2-6) the metadata is installed, an icon of the MFP displayed on the Devices and Printers folder screen is changed. Thus, the installation of the metadata for the MFP can be recognized from a displayed content on the screen of the Devices and Printers folder.

However, when a design of an icon file contained in newly installed metadata for the MFP is similar to that of an icon file used thus far for displaying the MFP on the screen of the Devices and Printers folder, the installation of the new metadata cannon be recognized in the following environments.

(1) In a case where the metadata for the MFP is installed in the PC through the procedure (1-1) to (1-4)

In this case, the metadata for the MFP present on an information server apparatus is automatically installed in the PC. Thus, the installation of the metadata for the MFP cannot be recognized.

(2) In a case where a plurality of peripheral devices including the MFP are connected to the PC, and the metadata for the MFP has been installed in the PC In this case, new metadata for the MFP is installed in the PC through the procedures (2-1) to (2-6). In (2-4), a notification is displayed on the upper part of the screen of the Devices and Printers folder screen. Thus, installation of the new metadata can be recognized. However, since the displayed notification contains no name of the target device, the peripheral devices in which the new metadata has been installed cannot be recognized. When a peripheral device connected to the PC is only the MFP, in (2-4), it can be determined that the notification displayed on the upper part of the screen of the Devices and Printers folder is made for the MFP. Thus, in this case, the installation of the new metadata in the MFP can be recognized.

SUMMARY OF THE INVENTION

The present invention is directed to a highly operable peripheral device control system that can provide a device management screen for providing appropriate display or a function according to a user's use environment, and appropriately notifying, when metadata for a peripheral device connected to a PC is installed in the PC, the user of the installation target peripheral device.

According to an aspect of the present invention, an information processing apparatus for displaying a peripheral device management screen to manage a peripheral device includes a storage unit configured to store, in a storage part, peripheral device management information in which information to instruct execution of at least one processing relating to the peripheral device from the peripheral device management screen is defined, a management screen forming unit configured to determine a configuration and a content of the peripheral device management screen based on the information defined in the peripheral device management information, an installation determination unit configured to determine whether to install the peripheral device management information, a display determination unit configured to determine whether to automatically display the peripheral device management screen in response to the peripheral device management information being installed based on an installation determination result of the installation determination unit, and a display control unit configured to execute control to display the peripheral device management screen based on a display determination result of the display determination unit.

Aspects of the present invention provide the following effects.

(1) The highly operable peripheral device control system that can provide the device management screen for providing appropriate displays or functions according to the user's use environment can be achieved. (2) When the metadata for the peripheral device connected to the PC is installed in the PC, the user can be appropriately notified of the installation target peripheral device, thus providing high user operability.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 7 illustrates a content of a device management control file.

FIGS. 15A and 15B are flowcharts illustrating processing for updating and installing the device management file.

DESCRIPTION OF THE EMBODIMENTS

Various exemplary embodiments, features, and aspects of the invention will be described in detail below with reference to the drawings.

Among information of the OS of the Windows 7 cited below, those not specifically described are disclosed in the Internet, specifically, in a site of Microsoft Developer Network (MSDN) (http://msdn.microsoft.com/en-us/library/default.aspx) as of Sep. 15 of 2010, and thus unnecessary description is omitted.

Information of a USB below is disclosed in a site of Universal Serial Bus (http://www.usb.org/home) as of Sep. 15 of 2010, and thus unnecessary description is omitted.

Information of Web Services in Devices (WSD) below is disclosed in a site of Hardware Developer Central (registered trademark) (http://www.microsoft.com/whdc/connect/rally/rallywsd.mspx), and thus unnecessary description is omitted.

Figure 1:
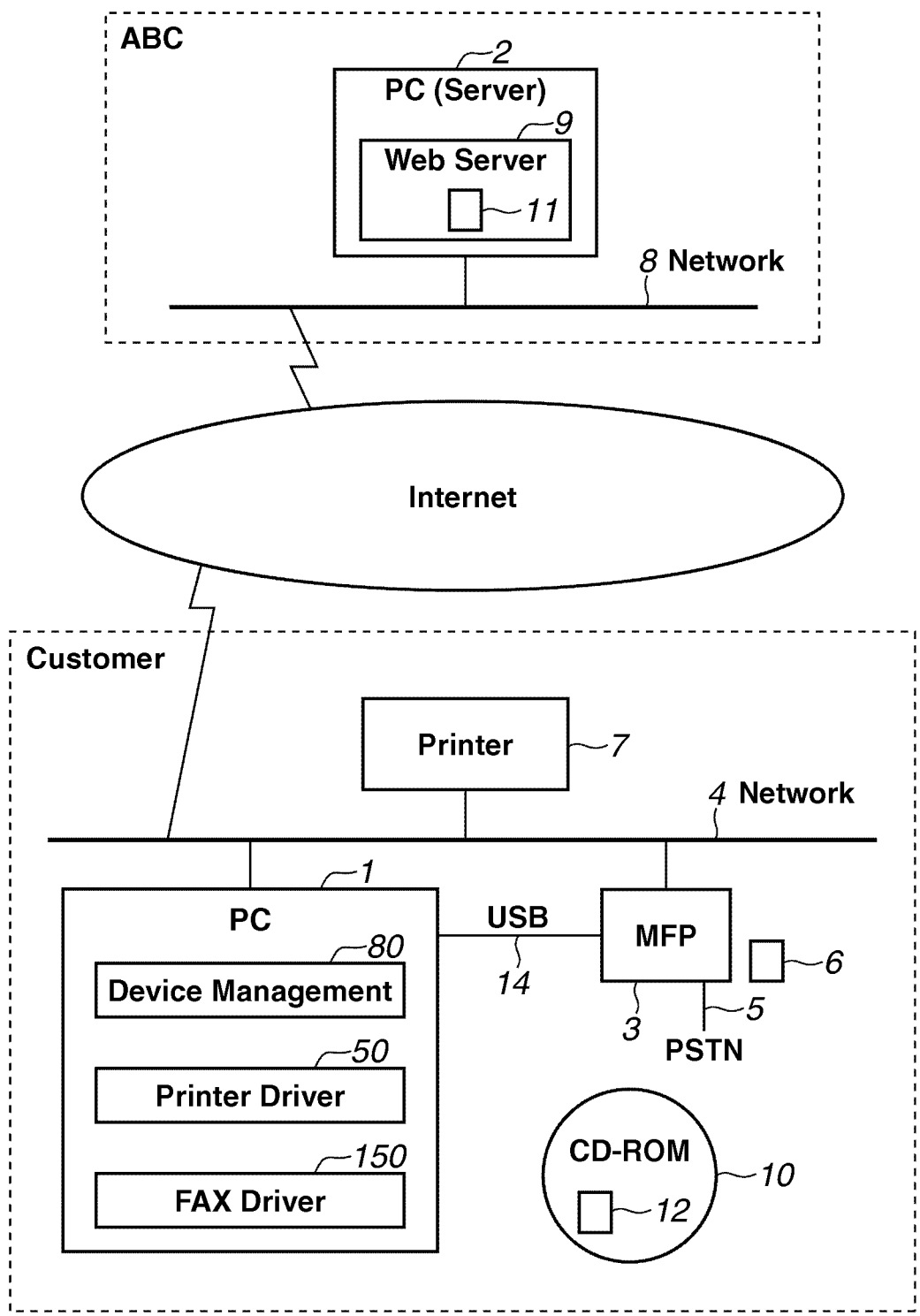
FIG. 1 is a block diagram illustrating a system configuration of a peripheral device control system including an information processing apparatus and a peripheral device according to a first exemplary embodiment.

FIG. 1 is a block diagram illustrating a system configuration of a peripheral device control system including an information processing apparatus and a peripheral device according to a first exemplary embodiment. In FIG. 1, information processing apparatuses 1 and 2 are general PCs. Each of the PC 1 and the PC 2 has a hardware configuration illustrated in FIG. 2A, and an OS similar to that of the Windows 7 provided by Microsoft Corporation of U.S. is installed. The PC 1 and the PC 2 are respectively connected to networks 4 and 8 each constituted by Ethernet. A MFP 3, which includes a color ink jet printer, a color facsimile, a color scanner, and an external storage for a flash memory, is an example of a peripheral device. A main function of the MFP 3 is a printer function, and a facsimile function and a scanner function are subfunctions.

Peripheral devices can be a printer, a copying machine, a facsimile, a scanner, a digital camera, and an apparatus including a combined function of these. The MFP 3, which has a hardware configuration described below referring to FIG. 2B, is connected to the PC 1 via a USB interface 14 or the network 4 to execute bidirectional communication. An application 80 has an executable file (*. EXE) for the Windows. As an example of an embodiment application, the application 80 has a function of displaying a device management screen illustrated in FIG. 6B.

Figure 4:
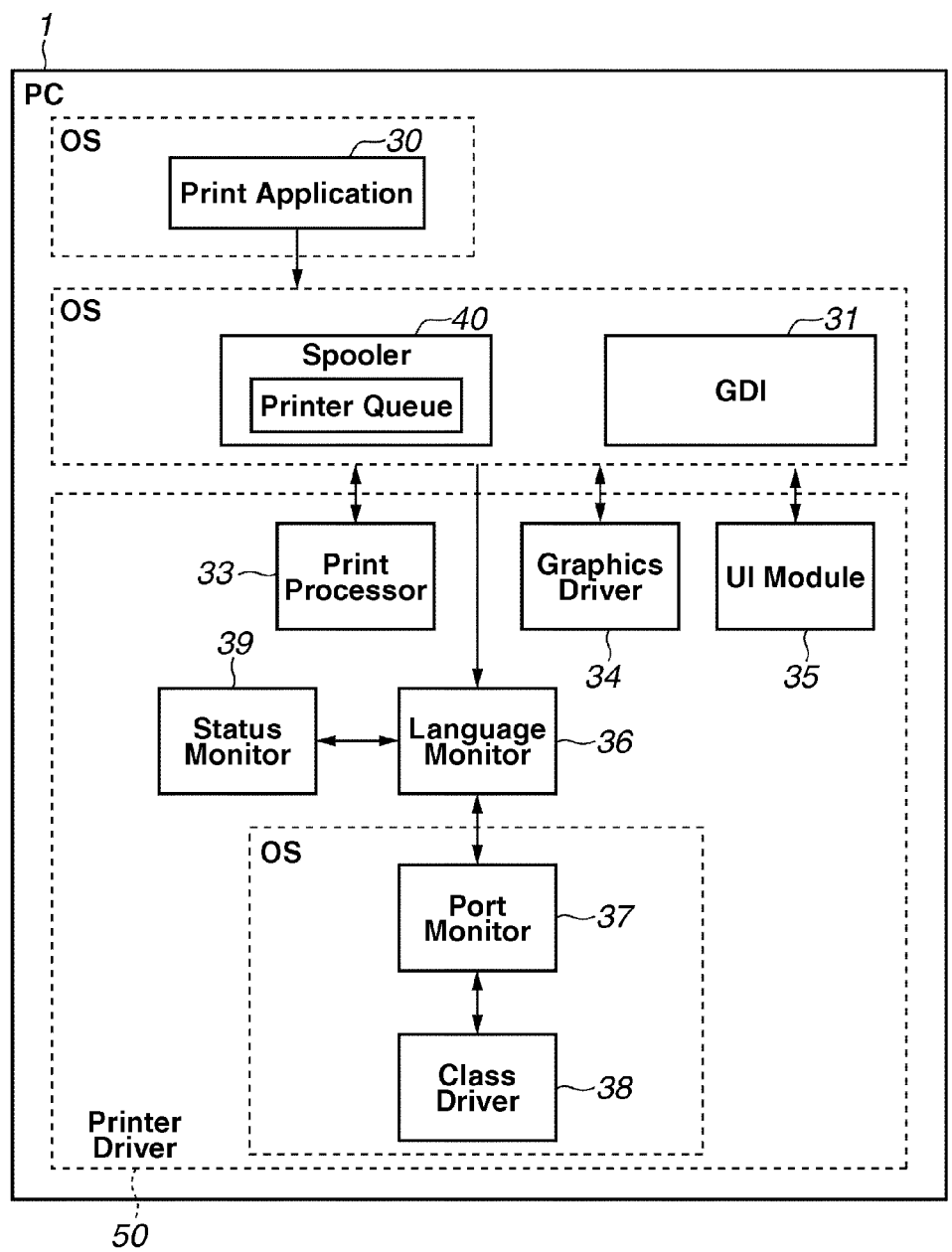
FIG. 4 illustrates a configuration of a printer driver in the PC.

The peripheral device control system includes a printer driver 50 illustrated in FIG. 4, and a FAX driver 150 (not illustrated). The network 4 is a home network for a general household built where a user (customer) of the MFP 3 lives. The network 8 is an office network built in an ABC company. The PC 2 connected to the network 8 includes a web server 9 having a web server function, and provides a web site of the ABC company via the Internet. A CD-ROM 10 can be inserted into the PC 1 and stores software or an electronic file. File storage units 11 and 12 in the web server 9 and the CD-ROM store icon data (not illustrated) or image data (not illustrated) described below referring to FIGS. 6A and 6B and a device management file (not illustrated) containing a device management control file 800 described below referring to FIG. 7. Such data are distributed from these units. An analog telephone line 5 is used for facsimile transmission/reception by the PC 1 via the MFP 3. A flash memory 6 is loaded in a flash memory loading slot (not illustrated) of the MFP 3 so that it can be referred to as a storage from the PC 1.

Figure 2A:
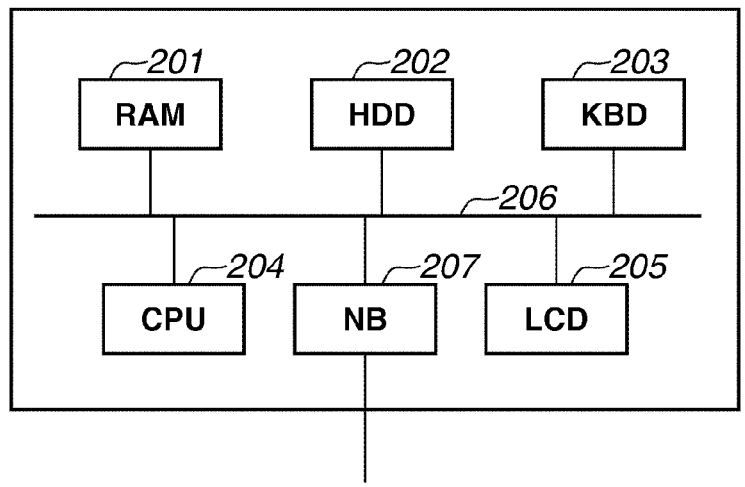
FIGS. 2A and 2B are block diagrams illustrating examples of hardware configurations of a PC and a MFP.
Figure 2B:
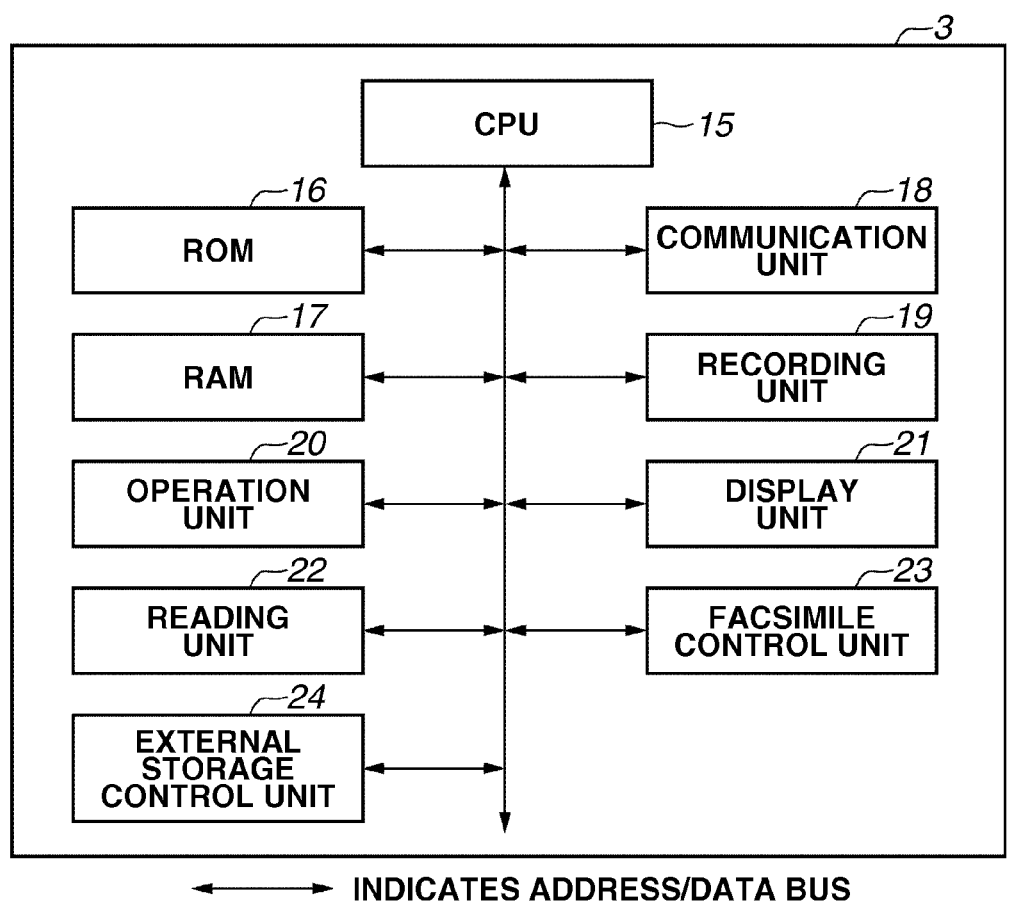
Figure 3:
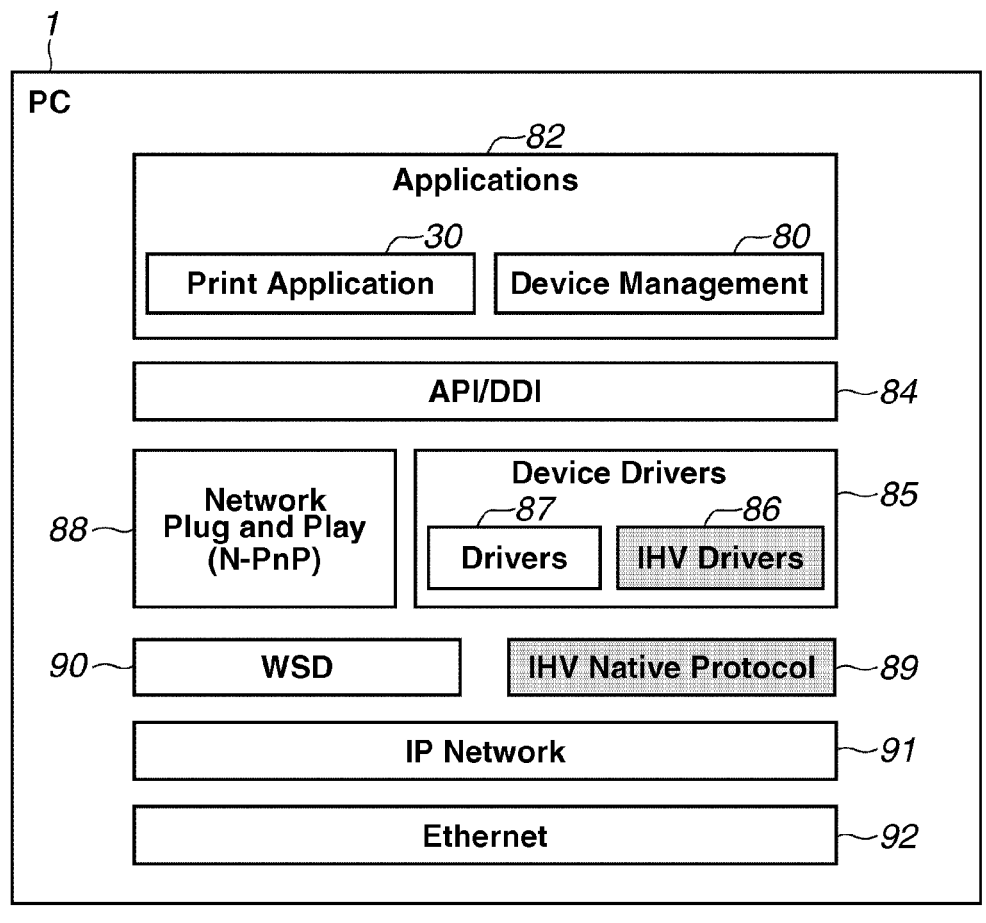
FIG. 3 illustrates a software configuration of the PC.
Figure 8:
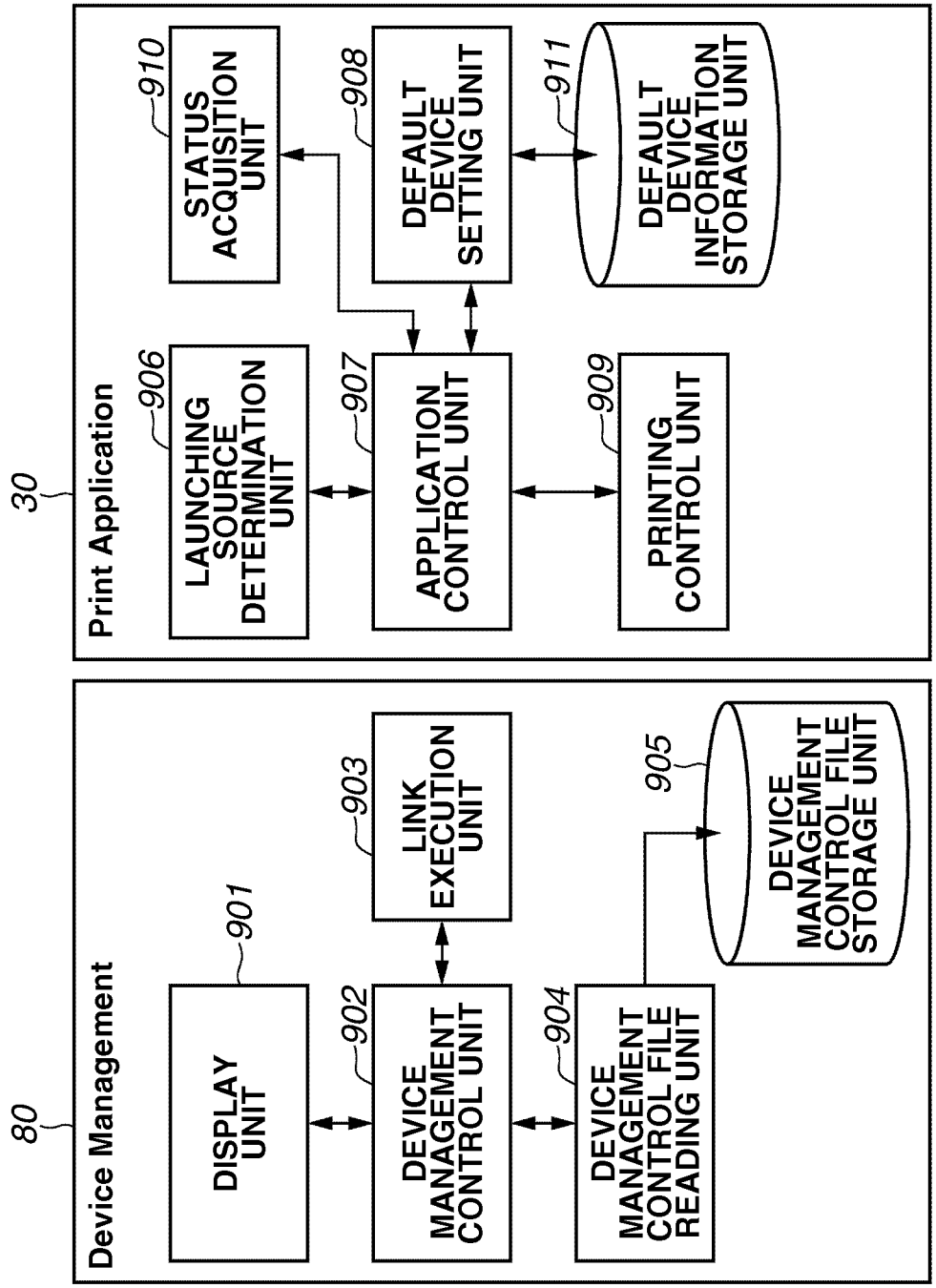
FIG. 8 illustrates a software configuration of device management and a print application.

FIGS. 2A and 2B are block diagrams illustrating examples of hardware configurations of a PC and a MFP. Each of the PC 1 and the PC 2 has a hardware configuration illustrated in FIG. 2A. The example of the PC 1 illustrated in FIG. 2A is described. As illustrated in FIG. 2A, the PC 1 includes a random access memory (RAM) 201, a hard disk drive (HDD) 202 that is a storage unit, a keyboard (KB) 203 that is an example of an input unit, a central processing unit (CPU) 204 of a control unit, a liquid crystal display (LCD) 205 that is an example of a display unit, a network board (NB) 207 that is an example of a communication control unit, and a bus 206 for interconnecting the components of the PC 1. A USB port for the USB interface 14 is included in the NB 207. The storage unit can be a portable CD-ROM or an internally installed ROM. Thus, an application such as device management 80 or a print application 30, and functions of modules illustrated in FIGS. 3, 4, and 8 are achieved.

The MFP 3 has the hardware configuration illustrated in FIG. 2B. The example of the MFP 3 illustrated in FIG. 2B is described. In FIG. 2B, a CPU 15 of the MFP 3, which includes a microprocessor, controls a RAM 17, a communication unit 18, a recording unit 19, an operation unit 20, a display unit 21, a reading unit 22, a facsimile control unit 23, and an external storage unit 24 according to a program stored in a ROM 16. The ROM 16 stores a program for causing the MFP 3 to execute recording (printing) or notifying the PC 1 of a state of a printing operation under control of the printer driver 50 (described below referring to FIG. 4). Further, the ROM 16 stores a program for causing the MFP 3 to execute facsimile transmission or reception or notifying the PC 1 of a state of facsimile transmission or reception under control of the FAX driver 150 (not illustrated). In addition, the ROM 16 stores a program for causing the MFP 3 to execute image reading or notifying the PC 1 of a state of a reading operation under control of a scanner driver (not illustrated).

The RAM 17 temporarily stores print data mainly transmitted from the PC 1, which is printed by the recording unit 19. The RAM 17 temporarily stores image data read by the reading unit 22, facsimile transmission data transmitted from the PC 1, or facsimile reception data received by the facsimile control unit. The communication unit 18, which includes the USB interface 14, a connection port for the network 4, and a connection port for the analog telephone line 5, controls analog communication of the USB, the Ethernet, and the facsimile.

The recording unit 19 includes a recording unit having an ink-jet recording head, each color ink, a carriage, and a recording paper conveying mechanism, and an electric circuit having an application specific integrated circuit (ASIC) for generating a printing pulse by the recording head based on the print data. By a printing operation or a facsimile transmission operation on a printable application, a displayed content (image data) of a file opened in the application is temporarily stored as an EMF spool file in the HDD 202 of the PC 1, converted into print data or facsimile transmission data containing a MFP 3 control command via the printer driver 50 or the FAX driver 150, and then transmitted to the MFP 3 via the USB interface 14 or the network 4.

The print data received by the MFP 3 is converted into a printing pulse by the recording unit 19 to be recorded on recording paper. The facsimile data received by the MFP 3 is converted based on a facsimile communication protocol by the facsimile control unit 23 to be transmitted to an opposite facsimile device via the analog telephone line 5. The operation unit 20, which includes various buttons such as a power button and a reset button, can operate the MFP 3. The display unit 21, which includes a touch-panel liquid crystal display, can display or input a state of the MFP 3, various settings or telephone numbers.

The reading unit 22, which includes an electric circuit having a color image sensor or an ASIC for image processing, controls a scanner function. The facsimile control unit 23, which includes a facsimile modem or an analog communication circuit, controls facsimile transmission or reception according to the facsimile communication protocol. The external storage control unit 24, which includes a flash memory loading slot or a storage interface circuit, controls the loaded flash memory.

FIG. 3 illustrates a software configuration of the PC. In FIG. 3, the software configuration includes an Ethernet control stack 92 for controlling the Ethernet, an image processing (IP) network control stack 91 for controlling an IP network, a WSD control stack 90 for controlling a WSD, an independent hardware vendor (IHV) native protocol control stack 89 for controlling an independent protocol of an IHV, and a network plug and play (N-PnP) control stack 88 for controlling the N-PnP. As a series of extended functions of a plug and play for providing support to a network connection device, there are plug and play extensions (PnP-X) as functions normally included in the OS of the Windows 7. In this embodiment, the N-PnP having functions similar to the extended functions is used as an example.

A device driver group 85 includes a standard driver group 87 normally included in the OS and an IHV driver group 86 provided from the IHV. An application/DDI interface 84 includes an application programming interface (API) and a device driver interface (DDI). The application 80 is normally included in the OS for device management. An application 30 is printable as described below. An application group 82 includes the device management 80 and the application 30. The device management 80 can manage, execute, and display a Devices and Printers folder 500 described below referring to FIG. 6A and a device management screen 600 described below referring to FIG. 6B, via the application/DDI interface 84.

FIG. 4 illustrates a configuration of the printer driver of the PC. In FIG. 4, the printer driver 50 of the MFP 3 installed in the PC 1 includes a plurality of modules 33 to 36 and 39. The printable application 30 is, for example, Notepad (Notepad.exe) that is a text editor normally included in the OS. A graphic device interface (GDI) 31 is a part of the OS. A print queue 32 is a part of a spooler 40, and print jobs are queued. A print processor 33 changes a print layout or executes special processing for a print image. A graphics driver 34 executes, by using the image processing of the printer driver as a core, print processing based on a drawing command issued from the GDI 31 to create a printing control command.

A user interface (UI) module 35 provides and controls a user interface of the printer driver. A language monitor 36 controls data transmission/reception as a data communication interface. A status monitor 39 displays a remaining ink amount of the MFP 3, a warning or an error state. A port monitor 37 transmits data received from the language monitor 36 to an appropriate port or receives data transmitted from the MFP 3 via a class driver 38. The class driver 38 is a low-level module nearest to the port. According to an embodiment, the class driver 38 is a printer class driver of the independent protocol of the WSD or the IHV, and controls the port (USB or network port). The printer driver 50 is available from the ABC company that manufactures the MFP 3.

Figure 5:
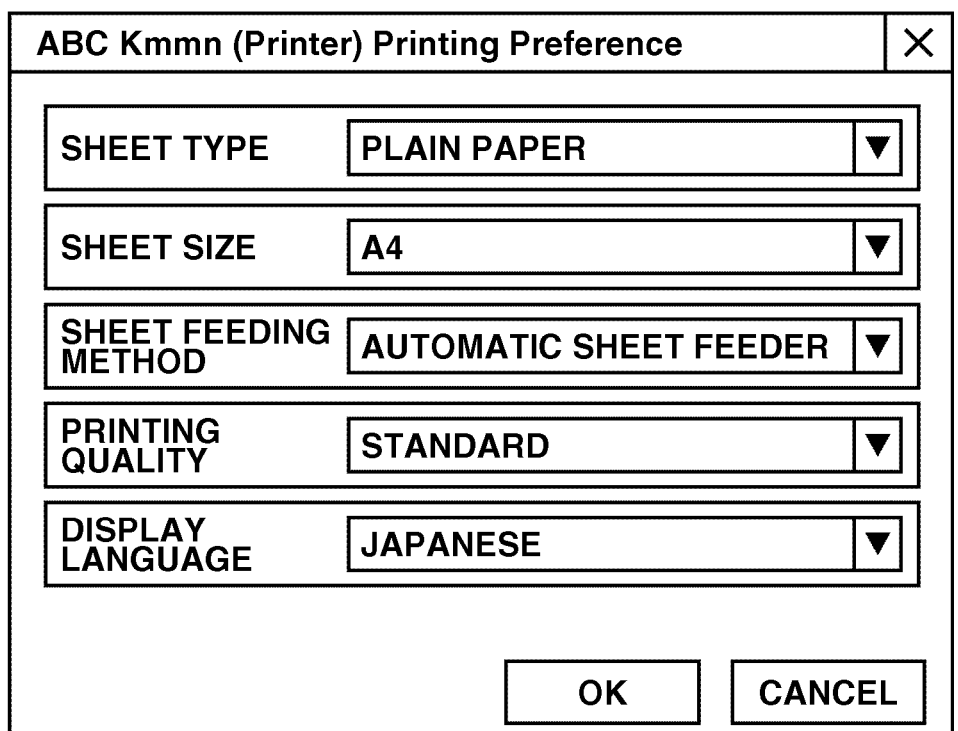
FIG. 5 illustrates a print setting screen of the printer driver in the PC.

FIG. 5 illustrates a print setting dialog of the printer driver 50. By selecting an operation unit on the print setting dialog 104 illustrated in FIG. 5, setting necessary for printing in the MFP 3 can be made.

Figure 6A:
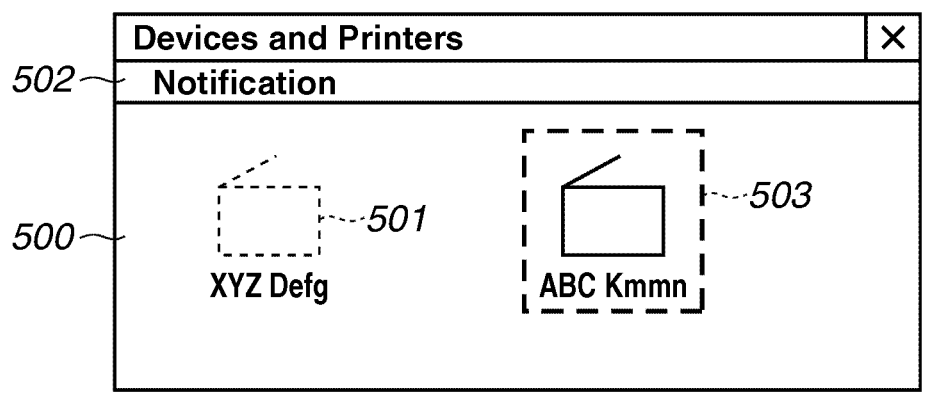
FIGS. 6A and 6B illustrate a Devices and Printers folder and a device management screen.
Figure 6B:
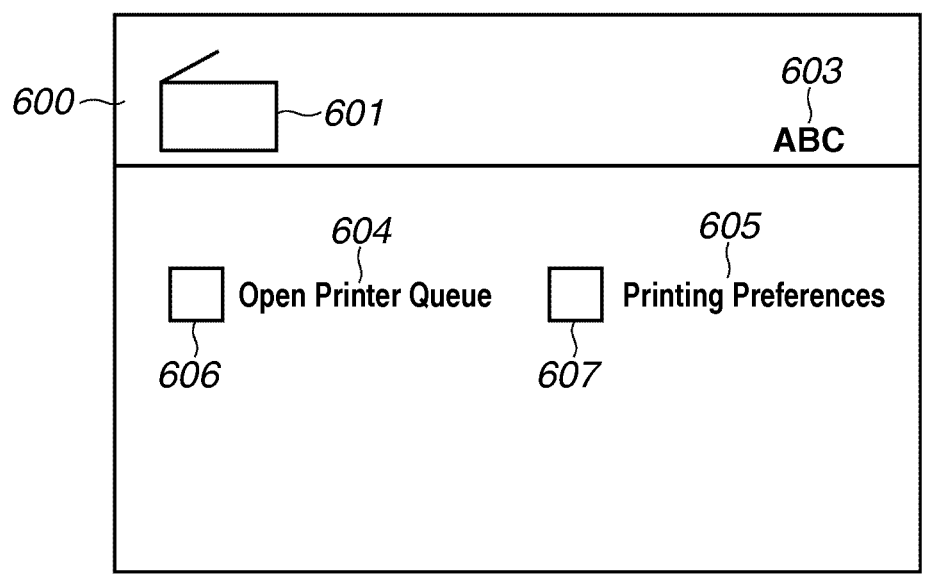

FIGS. 6A and 6B illustrate the Devices and Printers folder and the device management screen. In FIG. 6A, the Devices and Printers folder 500 is displayed on the PC 1, and a printer or a FAX usable in the PC 1 is displayed for each driver in the folder. In this embodiment, a peripheral device 501 named XYZ Defg and a peripheral device 503 named ABC Kmmn are displayed as usable peripheral devices. In the Devices and Printers folder 500, the peripheral device 501 having an icon indicated by a dotted line is unusable, while the peripheral device 503 indicated by a solid line is usable.

An area 502 displays a notification relating to the Devices and Printers folder 500. For example, with respect to one or more peripheral devices (device 1) among the peripheral devices displayed in the Devices and Printers folder 500, if a device management file for the peripheral device 1 which is newer than the device management file for the peripheral device 1 present in the device management file storage unit 905 is present in the PC 2 or the CD-ROM 10, a notification indicating permission of acquiring the new device management file for the peripheral device 1 is displayed in this area. When there is no content for notification, nothing is displayed in the area.

In FIG. 6B, a device management screen 600 is activated to be displayed when the peripheral device 503 in the Devices and Printers folder 500 illustrated in FIG. 6A is selected. The MFP 3 can be managed by using this device management screen 600. In the upper part of the device management screen 600, a device icon 601, a device name 602, and manufacturing source information 603 are displayed. In the device name 602, a device name of the peripheral device 503 of the Devices and Printers folder 500 is displayed. In the manufacturing source information 603, a character string designated in a <dm:manufacturer>element 803 illustrated in FIG. 7 is displayed.

In the lower part of the device management screen 600, a link to a function associated with the peripheral device 503 is displayed. A print queue button 604 and a print setting button 605 are displayed. In a <dm:functions>element 803 illustrated in FIG. 7, <dm:function>elements 804 and 810 indicating a button and a function are described. Data of the device icon 601, data of a print queue button icon 606, icon data of a print setting button icon 607, and icon data of the peripheral device 503 in the Devices and Printers folder 500 illustrated in FIG. 6A are integrated as a device management file together with a device management control file 800 illustrated in FIG. 7, and stored as apart of data in the device management file storage unit 905 (not illustrated).

FIG. 7 illustrates a content of the device management control file 800. The device management control file 800 is for an operation in English. Information illustrated in FIG. 7 is stored in the file storage unit 11 or 12. In FIG. 7, a name of the ABC company that is a manufacturing source of the peripheral device (MFP 3) is set in the <dm:manufacturer>element 801. In a <dm:model>element 802, Kmmn that is a name of the peripheral device (MFP 3) is set. In the element 803, device ID that is information unique to the device is set. The device ID is indicated by a character string such as "MFG: ABC;MDL:Kmmn;CLS:PRINTER;CMD:P4;DES:ABC Kmmn;". The PC 1 can acquire the device ID of the printer function of the MFP 3 from the MFP 3 via the USB interface 14 or the network 4. The device ID indicates the following information.

Manufacturing source (MFG:): ABC
Model (MDL:): Kmmn
Class (CLS:): PRINTER
Command (CMD:): P4 ((ABC company private printing control command) description (DES:)): in ABC Kmmn <dm:LastModifiedDate>2011-01-01T00:00:00z</dm:LastModifiedDate>element 812, last date when device management control file 800 is updated is set.

In an element 811 <dm:LaunchDeviceManagementAfterInstallation>true</dm:LaunchDeviceManagementAfterinstallation>, information is set, which indicates setting as to whether to automatically activate the device management screen 600 when a device management file including the device management control file 800 is installed. In an element 813 <dm:DeviceCategory>Printer</dm:DeviceCategory>, information indicating a category of the device is set.

Such information is used when installing the device management control file 800. In the device management control file 800, information necessary for constituting the device management screen 600 is described. The device management screen 600 is activated for display when the MFP 3 is connected to the PC 1. To display the printer queue button 604 and the print setting button 605 illustrated in FIG. 5 on the device management screen 600, <dm:function>elements 805 and 808 indicating the button and the function are set in an element 804<dm:functions>.

Under the element 805<dm:function>, in an element 806<dm:name xml:lang="en-US">Open Printer Queue</dm:name>, a character string of "Open Printer Queue" to be displayed on the printer queue button 604 is set. In an element 807 <dm:execute>openPrinterQueue</dm:execute>, a code of openPrinterQueue is set to indicate a function (program) for displaying a printer queue folder.

Under the element 808<dm:function>, in an element 809 <dm:name xml:lang="en-US">PrintingPrefernces</dm:name>, a character string of "Printing Preferences" to be displayed on the print setting button 605 is set. In the element 810<dm:execute>printingPreferences</dm:execute>, a code of printingPreferences is set to indicate a function (program) for displaying the print setting dialog illustrated in FIG. 5.

FIG. 8 illustrates a software configuration of the device management and the print application. In FIG. 8, the device management 80 includes a display unit 901, a device management control unit 902, a link execution unit 903, a device management control file reading unit 904, and a device management file storage unit 905. The device management file storage unit 905 stores a device management file including the device management control file 800 stored in step S1502 illustrated in FIG. 11. The print application 30 includes a launching source determination unit 906, an application control unit 907, a default device setting unit 908, a printing control unit 909, a status acquisition unit 910, and a default device information storage unit 911.

The device management screen 600 is activated and displayed by connecting the MFP 3 to the PC 1 via the USB interface 14 or the network 4, or selecting a device in the Devices and Printers folder 500 illustrated in FIG. 6A. An example where the device management screen 600 is activated and displayed by connecting the MFP 3 to the PC 1 via the USB interface 14 or the network 4 is mainly described.

Figure 9:
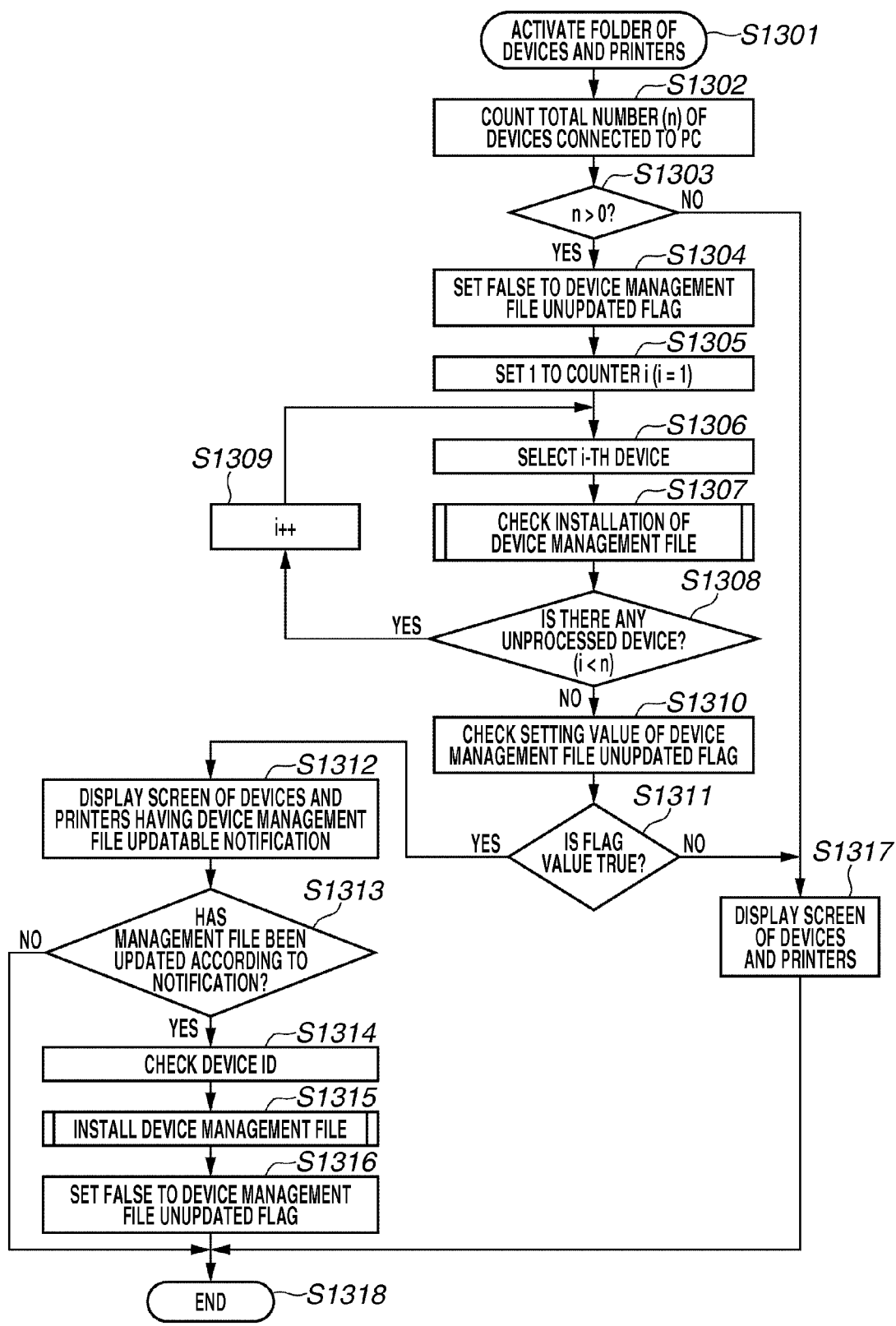
FIG. 9 is a flowchart illustrating processing when the Devices and Printers folder is activated.

FIG. 9 is a flowchart illustrating processing when the Devices and Printers folder is activated. A program relating to the flow illustrated in FIG. 9 is stored in the HDD 202, and read to the RAM 201 to be executed by the CPU 204. In FIG. 9, in step S1302, the device management 80 counts the number of all devices (MFPs 3) including the MFP 3 connected to the PC (PC 1) via the USB interface 14 or the network 4. When one or more devices are connected (YES in step S1303), the processing proceeds to step S1304. When the device is not connected (NO in step S1303), the processing proceeds to step S1317.

In step S1304, the device management 80 sets FALSE in a device management file unupdated flag which is prepared in a predetermined position of the HDD 201 of the PC 1. In step S1305, the device management 80 sets 1 in a counter i created in the RAM 201 of the PC 1. In step S1306, the device management 80 selects an i-th (1st) device. In step S1307, as to the device selected in step S1306, the device management 80 checks installation of a device management file described below referring to FIG. 10. When there is no more device to be processed (NO in step S1308), the processing proceeds to step S1310. When there is more device to be processed (YES in step S1308), in step S1309, the device management 80 increments the counter i by 1, and the processing proceeds to step S1306.

In step S1310, the device management 80 checks a setting value of a device management file unupdated flag. When TRUE is set in the device management file unupdated flag (YES in step S1311), the processing proceeds to step S1312.

When TRUE is not set (NO in step S1311), the processing proceeds to step S1317. In step S1312, the device management 80 displays a Devices and Printers folder screen that notifies permission of updating the device management file. When the user updates the device management file according to the notification (YES in step S1313), the processing proceeds to step S1314. When the user does not update (NO in step S1313), the processing proceeds to step S1317.

In step S1314, the device management 80 checks device ID stored in step S1410 in the processing for checking installation of the device management file, which is described below referring to FIG. 10. In step S1315, the device management file 80 installs the device management file, which is described below referring to FIG. 11. In step S1316, FALSE is set in the device management file unupdated flag. The processing then proceeds to step S1318 to complete the Devices and Printers folder activation. In step S1317, after the device management 80 displays the Devices and Printers folder screen, the processing proceeds to step S1318 to complete the Devices and Printers folder activation.

Figure 10:
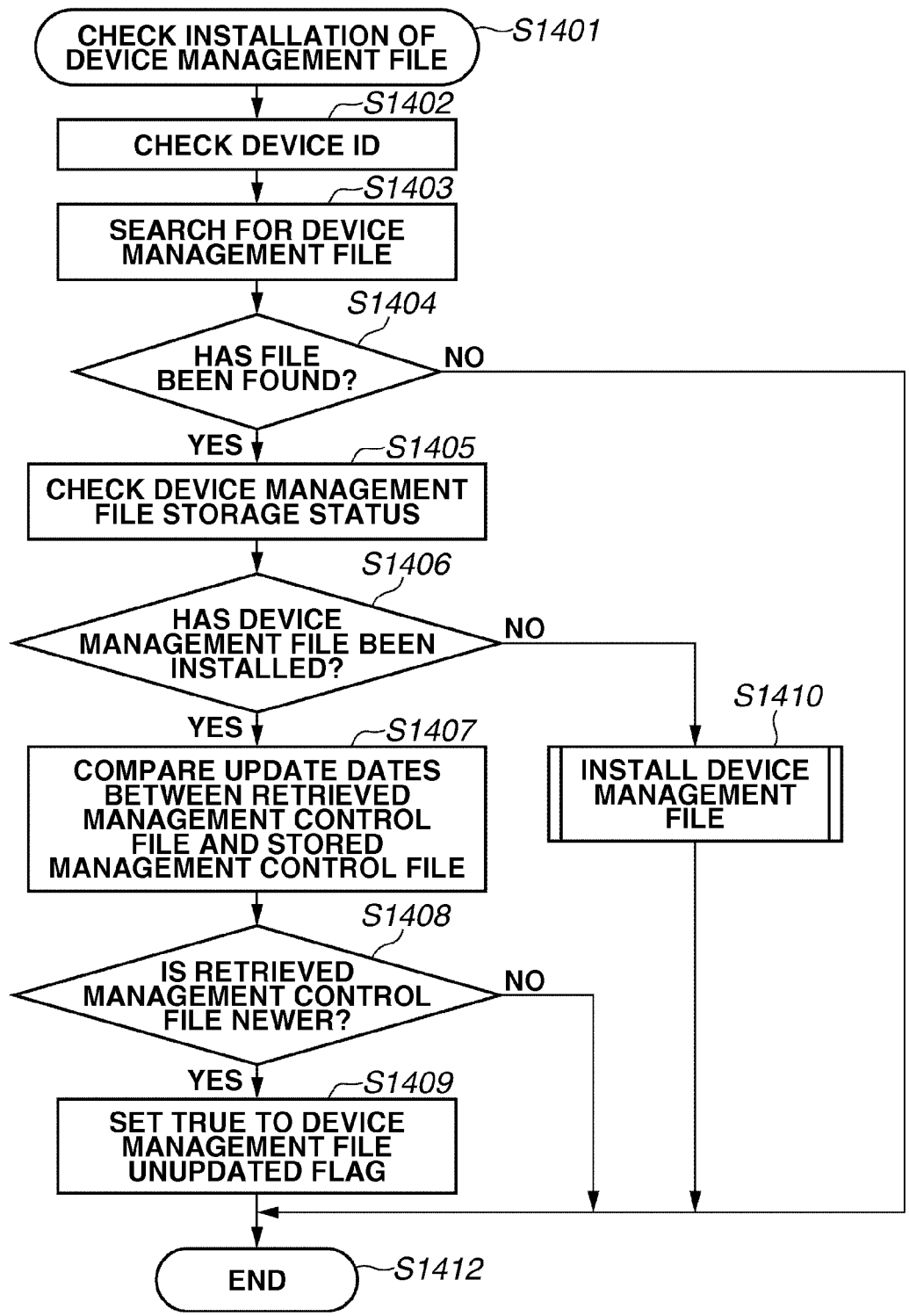
FIG. 10 is a flowchart illustrating processing for checking installation of a device management file.

FIG. 10 is a flowchart illustrating processing for checking installation of the device management file. A program relating to the flow illustrated in FIG. 10 is stored in the HDD 202, and read to the RAM 201 to be executed by the CPU 204. After the installation of the device management file is checked in step S1307 illustrated in FIG. 9, in FIG. 10, in step S1401, the device management 80 starts the processing for installing the device management file.

In step S1402, the device management 80 checks device ID of the device (MFP 3) connected via the USB interface 14 or the network 4. In step S1403, the device management 80 searches a device management control file 800 for the device (MFP 3) connected to the PC 1 based on information of a manufacturing source (MFG:) and a model (MDL:) contained in the device ID. In the device management control file 800 illustrated in FIG. 7, the manufacturing source (MFG:) "ABC" and the model (MDL:) "Kmmn" corresponding to the device (MFP 3) are respectively described in the element 801 <dm:manufacturer> and the element 802 <dm:model>. Based on the information described in the element 801 and the element 802, the device management 80 searches the device management control file 800 for the device (MFP 3) from the file storage unit 11 or 12 in the CD-ROM 10 inserted into the PC 1.

In step S1404, the device management 80 determines whether the device management control file 800 has been found from the file storage unit 11 or 12. When the device management control file 800 has been found (YES in step S1404), the processing proceeds to step S1405. When the device management control file 800 has not been found (NO in step S1404), the processing proceeds to step S1412 to end the processing for checking the installation of the device management file. In step S1405, the device management 80 checks whether the device management control file 800 for the device (MFP 3) has already been stored in a predetermined position in the HDD 202 of the PC 1. When the device management control file 800 for the device (MFP 3) has been stored (YES in step S1406), the processing proceeds to step S1407. When the device management control file 800 for the device (MFP 3) has not been stored in the predetermined position in the HDD 202 of the PC 1 (NO in step S1406), in step S1411, the device management 80 executes processing for installing the device management file, which is described below referring to FIG. 11.

In step S1407, the device management 80 compares the last updating dates of the device management control file 800 described in the element 812 between the device management control file 800 for the MFP 3 searched for in step S1403 and the device management control file 800 for the MFP 3 stored in the predetermined position in the HDD 202 of the PC 1. When the date described in the element 812 of the device management control file 800 for the MFP 3 searched for in step S1403 is newer (YES in step S1408), the processing proceeds to step S1409. When the date described in the element 812 for the MFP 3 searched for in step S1403 is not newer (NO in step S1408), the processing proceeds to step S1412 to end the processing for checking the installation of the device management file.

In step S1409, the device management 80 sets TRUE in the device management file unupdated flag which is prepared in the predetermined position in the HDD 202 of the PC 1. In step S1410, the device management 80 stores the device ID checked in step S1402 in a predetermined position in the HDD 202 of the PC 1. Then, the processing proceeds to step S1412 to end the processing for checking the installation of the device management file.

Figure 11:
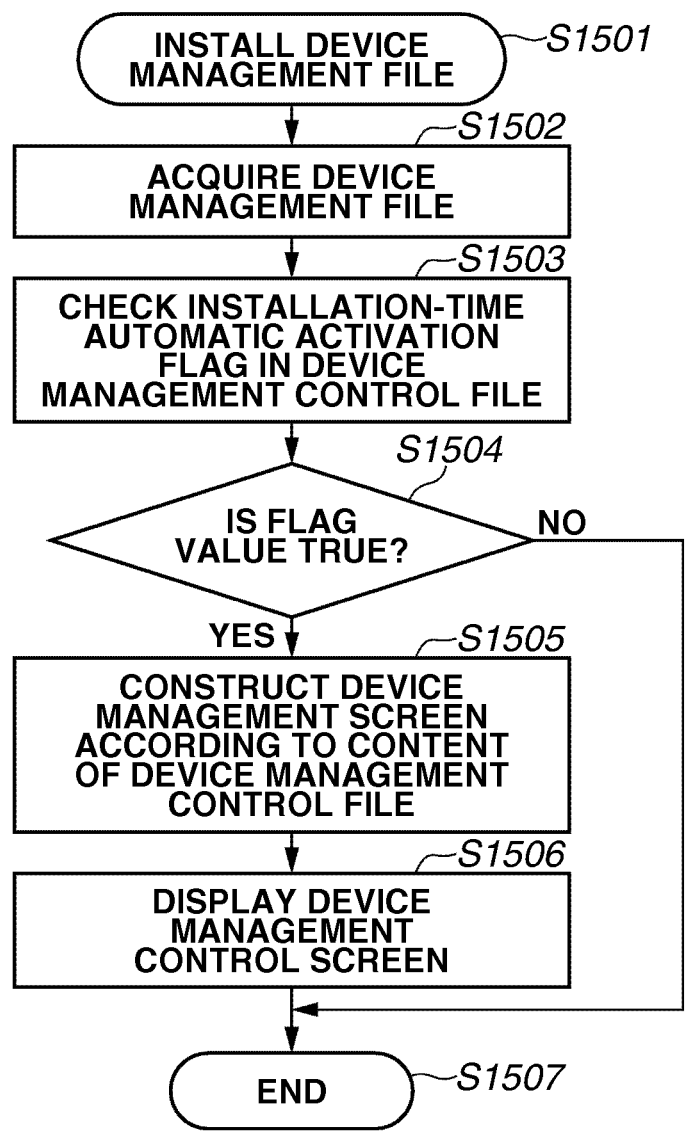
FIG. 11 is a flowchart illustrating processing for installing the device management file.

FIG. 11 is a flowchart illustrating processing for checking installation of the device management file. A program relating to the flow illustrated in FIG. 11 is stored in the HDD 202, and read to the RAM 201 to be executed by the CPU 204. In a case where the processing for installing the device management file is executed by the device management 80 in step S1315 illustrated in FIG. 9 or the processing for installing the device management file is executed by the device management 80 in step S1411 illustrated in FIG. 10, the processing for installing the device management file is executed in step S1501 in FIG. 11. In step S1502, based on the device ID information checked in step S1314 illustrated in FIG. 9 or in step S1402 illustrated in FIG. 10, the device management 80 acquires the device management control file 800 for the peripheral device (MFP 3) from the file storage unit 11 or 12 in the CD-ROM 10 inserted into the web server 9 or the PC 1 to store it in a predetermined position in the HDD 202 of the PC 1.

In step S1503, the device management 80 checks a value set in the element 811 in the device management control file 800 acquired in step S1502. When the value set in the element 811 is TRUE (YES in step S1504), the processing proceeds to step S1505. When the value set in the element 811 is not TRUE (NO in step S1504), the processing proceeds to step S1507 to complete the processing for installing the device management file. In step S1505, the device management 80 forms a device management screen according to a described content of the device management control file 800, and the processing proceeds to step S1506.

In step S1506, to clearly show that the device management control file has been updated, the device management 80 activates the device management screen. Then, the processing proceeds to step S1507 to complete the processing for installing the device management file.

A second exemplary embodiment will be described where in the system configuration of the first exemplary embodiment, a plurality of peripheral devices (e.g., MFP 3 and printer 7) are connected to one PC (PC 1) via the USB interface 14 or the network 4. In this case, when a device management file is simultaneously installed in the plurality of peripheral devices, activation of all device management screens for the peripheral devices may not be desirable. In such a case, it is desired that a device management screen of a peripheral device frequently used daily be activated in view of a use state of each peripheral device.

Figure 12:
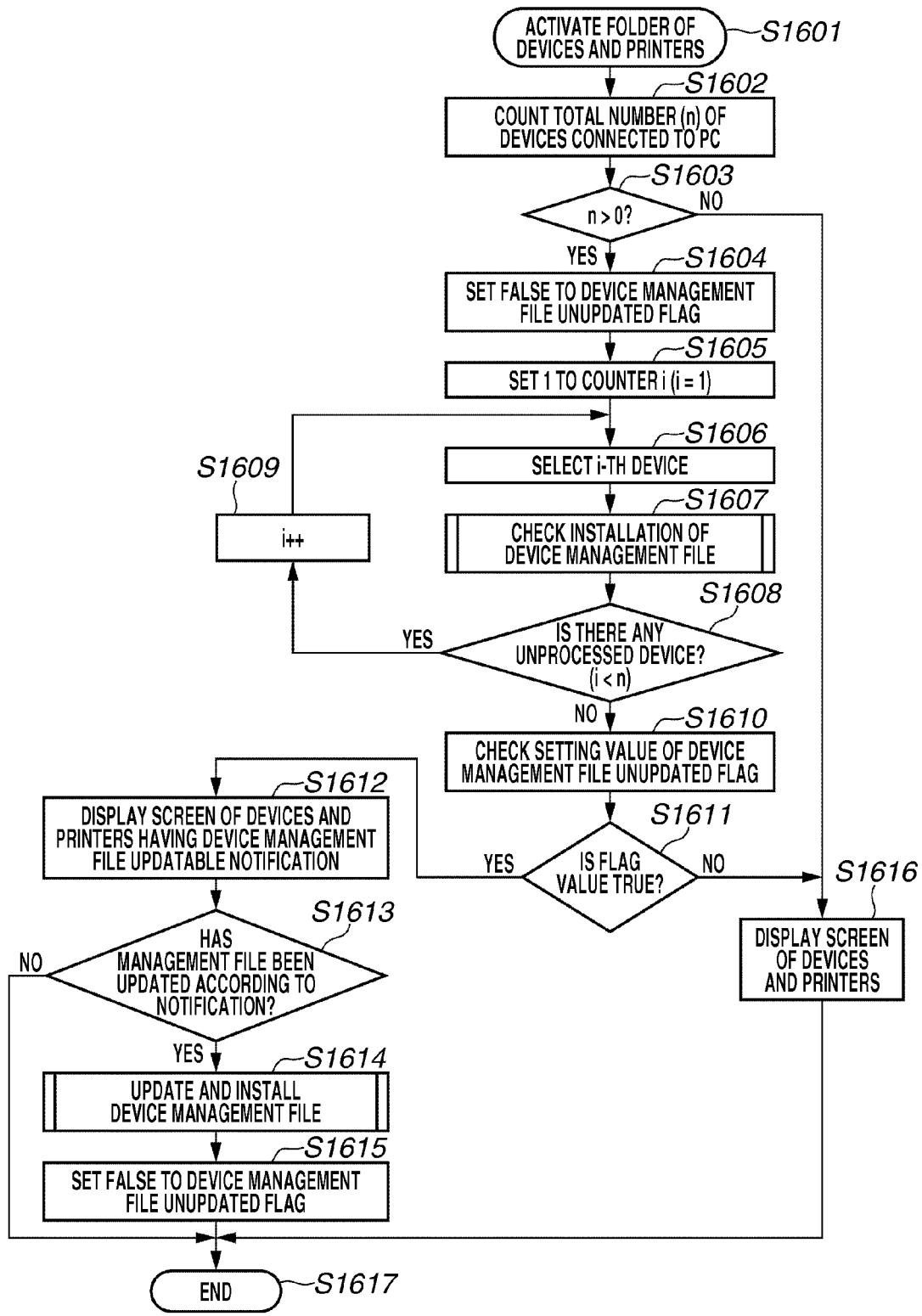
FIG. 12 is a flowchart illustrating processing when a Devices and Printers folder is activated.

FIG. 12 is a flowchart illustrating processing when a Devices and Printers folder is activated. A program relating to the flow illustrated in FIG. 12 is stored in the HDD 202, and read to the RAM 201 to be executed by the CPU 204. In FIG. 12, in step S1602, the device management 80 counts the number of all peripheral devices (MFPs 3) including the MFP 3 connected to the PC (PC 1) via the USB interface 14 or the network 4. When one or more peripheral devices are connected (YES in step S1603), the processing proceeds to step S1604. When the device is not connected (NO in step S1603), the processing proceeds to step S1616.

In step S1604, the device management 80 sets FALSE in a device management file unupdated flag, which is prepared in a predetermined position of the HDD 201 of the PC 1. In step S1605, the device management 80 sets 1 in a counter i created in the RAM 201 of the PC 1. In step S1606, the device management 80 selects an i-th (1st) peripheral device. In step S1607, for the peripheral device selected in step S1606, the device management 80 checks installation of a device management file described below referring to FIG. 13. When there is no more peripheral device to be processed (NO in step S1608), the processing proceeds to step S1610. When there is more peripheral device to be processed (YES in step S1608), in step S1609, the device management 80 increments the counter i by 1, and the processing proceeds to step S1606.

In step S1610, the device management 80 checks a setting value of the device management file unupdated flag. When TRUE is set in the device management file unupdated flag (YES in step S1611), the processing proceeds to step S1612. When TRUE is not set in the device management file unupdated flag (NO in step S1611), the processing proceeds to step S1616. In step S1612, the device management 80 displays a Devices and Printers folder screen that notifies permission of updating the device management file. When the user updates the device management file according to the notification (YES in step S1613), the processing proceeds to step S1614. When the user does not update the device management file (NO in step S1613), the processing proceeds to step S1617 to complete the processing for activating the Devices and Printers folder.

In step S1614, the device management 80 updates and installs the device management file, which is described below referring to FIG. 16. In step S1615, FALSE is set in the device management file unupdated flag. The processing then proceeds to step S1617 to complete the Devices and Printers folder activation. In step S1616, after the Devices and Printers folder screen is displayed by the device management 80, the processing proceeds to step S1617 to complete the Devices and Printers folder activation.

Figure 13:
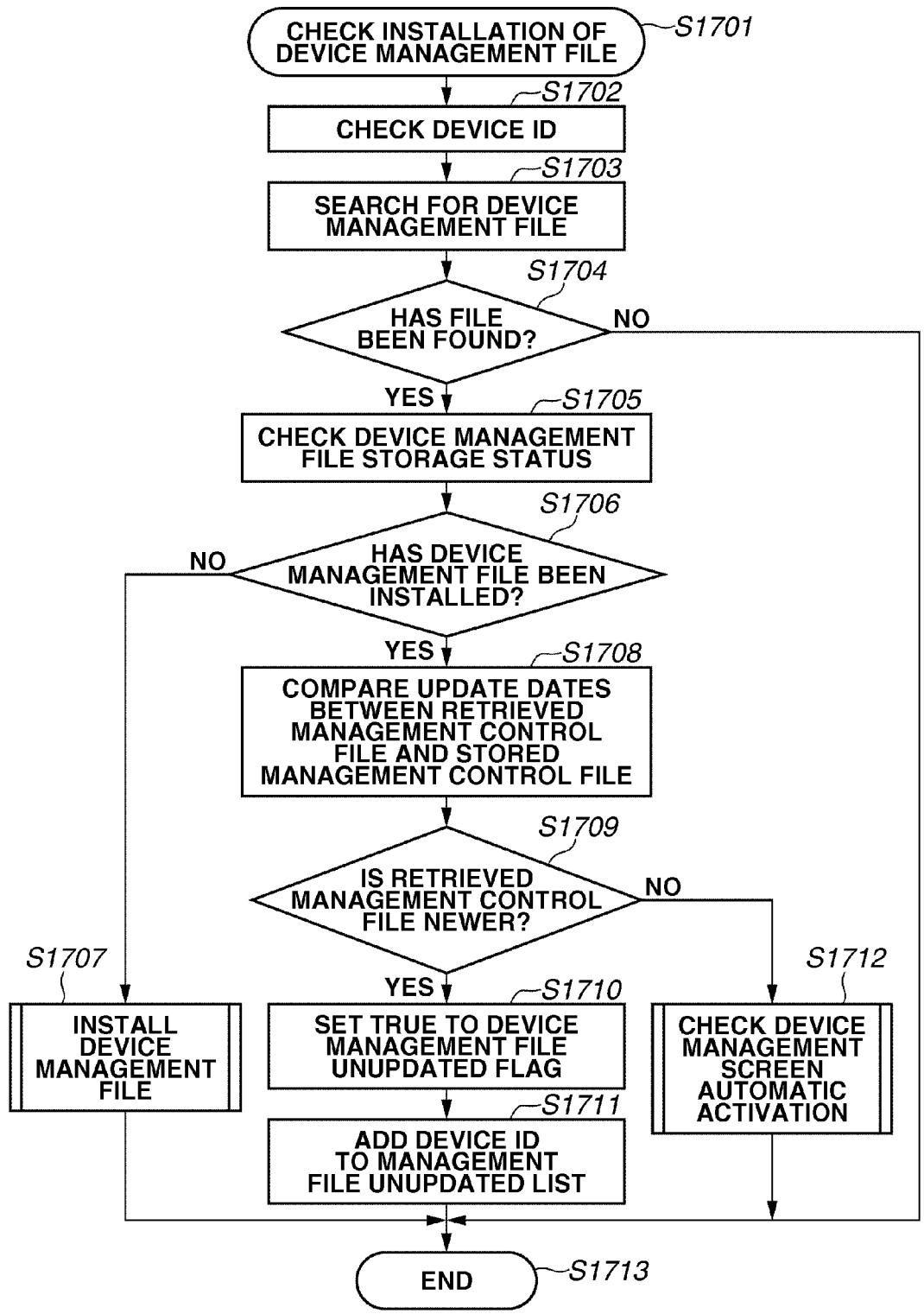
FIG. 13 is a flowchart illustrating processing for checking installation of a device management file.

FIG. 13 is a flowchart illustrating processing for checking installation of the device management file. A program relating to the flow illustrated in FIG. 13 is stored in the HDD 202, and read to the RAM 201 to be executed by the CPU 204. After the installation checking of the device management file is executed in step S1607 illustrated in FIG. 12, the device management 80 starts the processing for installing the device management file, in step S1701 in FIG. 13.

In step S1702, the device management 80 checks device ID of the peripheral device (MFP 3) connected via the USB interface 14 or the network 4. In step S1703, the device management 80 searches a device management control file 800 for the peripheral device (MFP 3) connected to the PC 1 based on information of a manufacturing source (MFG:) and a model (MDL:) contained in the device ID. In the device management control file 800 illustrated in FIG. 7, the manufacturing source (MFG:) "ABC" and the model (MDL:) "Kmmn" corresponding to the peripheral device (MFP 3) are respectively described in the element 801 <dm:manufacturer> and the element 802 <dm:model>.

Based on the information described in the element 801 and the element 802, the device management 80 searches the device management control file 800 for the peripheral device (MFP 3) from the file storage unit 11 or 12 in the CD-ROM 10 inserted into the PC 1. In step S1704, the device management 80 determines whether the device management control file 800 has been found from the file storage unit 11 or 12. When the device management control file 800 has been found (YES in step S1704), the processing proceeds to step S1705. When the device management control file 800 has not been found (NO in step S1704), the processing proceeds to step S1713 to end the processing for checking the installation of the device management file.

In step S1705, the device management 80 checks whether the device management control file 800 for the peripheral device (MFP 3) has been stored in a predetermined position in the HDD 202 of the PC 1. When the device management control file 800 for the peripheral device (MFP 3) has been stored (YES in step S1706), the processing proceeds to step S1708. When the device management control file 800 for the peripheral device (MFP 3) has not been stored in the predetermined position in the HDD 202 of the PC 1 (NO in step S1706), in step S1707, the device management 80 executes processing for installing the device management file, which is described below referring to FIGS. 15A and 15B.

In step S1708, the device management 80 compares the last updating dates of the device management control file 800 described in the element 812 between the device management control file 800 for the peripheral device (MFP 3) searched for in step S1703 and the device management control file 800 for the peripheral device (MFP 3) stored in the predetermined position in the HDD 202 of the PC 1. When the date described in the element 812 of the device management control file 800 for the peripheral device (MFP 3) searched for in step S1703 is newer (YES in step S1709), the processing proceeds to step S1710. When the date described in the element 812 for the peripheral device searched for in step S1703 is not newer (NO in step S1709), in step S1712, the device management 80 executes processing for automatically checking activation of a device management screen, which is described below referring to FIG. 14, and the processing proceeds to step S1713 to end the processing for checking the installation of the device management file.

In step S1710, the device management 80 sets TRUE in the device management file unupdated flag, which is prepared in the predetermined position in the HDD 202 of the PC 1. In step S1711, the device management 80 adds the device ID checked in step S1702 to a management file unupdated list stored in a predetermined position of the HDD 2 of the PC 1. Then, the processing proceeds to step S1713 to end the processing for checking the installation of the device management file.

Figure 14:
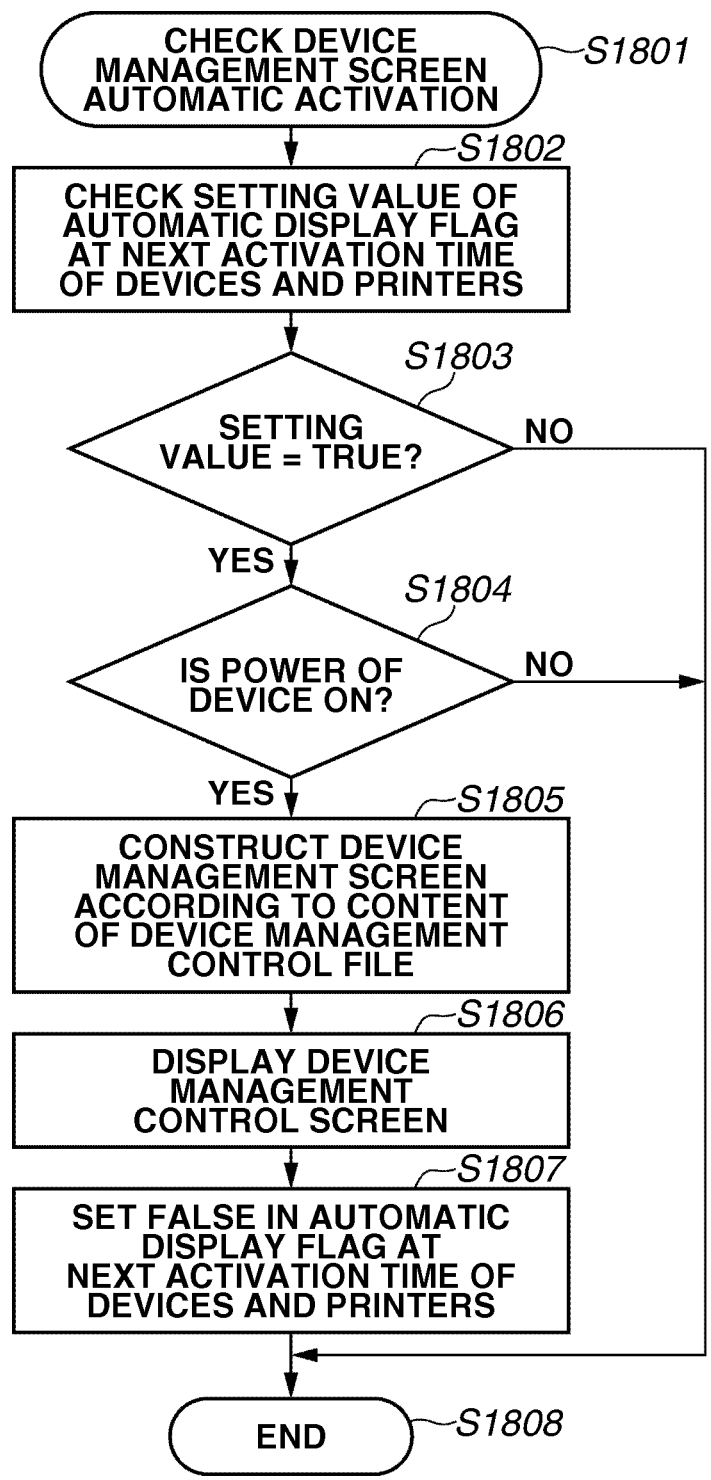
FIG. 14 is a flowchart illustrating processing for checking automatic launch of a device management screen.

FIG. 14 is a flowchart illustrating processing for automatically checking activation of the device management screen. A program relating to the flow illustrated in FIG. 14 is stored in the HDD 202, and read to the RAM 201 to be executed by the CPU 204. In a case where the automatic launch checking of the device management screen is executed in step S1712 illustrated in FIG. 13, the device management 80 starts the processing for automatically checking activation of the device management screen, in step S1801 in FIG. 14.

In step S1802, based on the device ID acquired in step S1702, the device management 80 checks a setting value of an automatic display flag for next activation time of Devices and Printers stored in a predetermined position of the HDD 202 of the PC 1. When TRUE is set in the automatic display flag for next activation time of Devices and Printers (YES in step S1803), the processing proceeds to step S1804. When TRUE is not set in the automatic display flag for next activation time of Devices and Printers (NO in step S1803), the processing proceeds to step S1808 to end the processing for automatically checking activation of the device management screen.

In step S1804, the device management 80 checks whether power for the peripheral device (MFP 3) is ON. When the power for the peripheral device is ON (YES in step S1804), the processing proceeds to step S1805. When the power for the peripheral device is not ON (NO in step S1804), the processing proceeds to step S1808 to end the processing for automatically checking activation of the device management screen.

In step S1805, the device management 80 forms a device management screen according to a described content of the device management control file 800. After the device management screen is activated in step S1806, the processing proceeds to step S1807. In step S1807, the device management 80 sets FALSE in the automatic display flag for next activation time of Devices and Printers stored in the predetermined position of the HDD 202 of the PC 1. Then, the processing proceeds to step S1808 to end the processing for automatically checking activation of the device management screen.

Figure 15A:
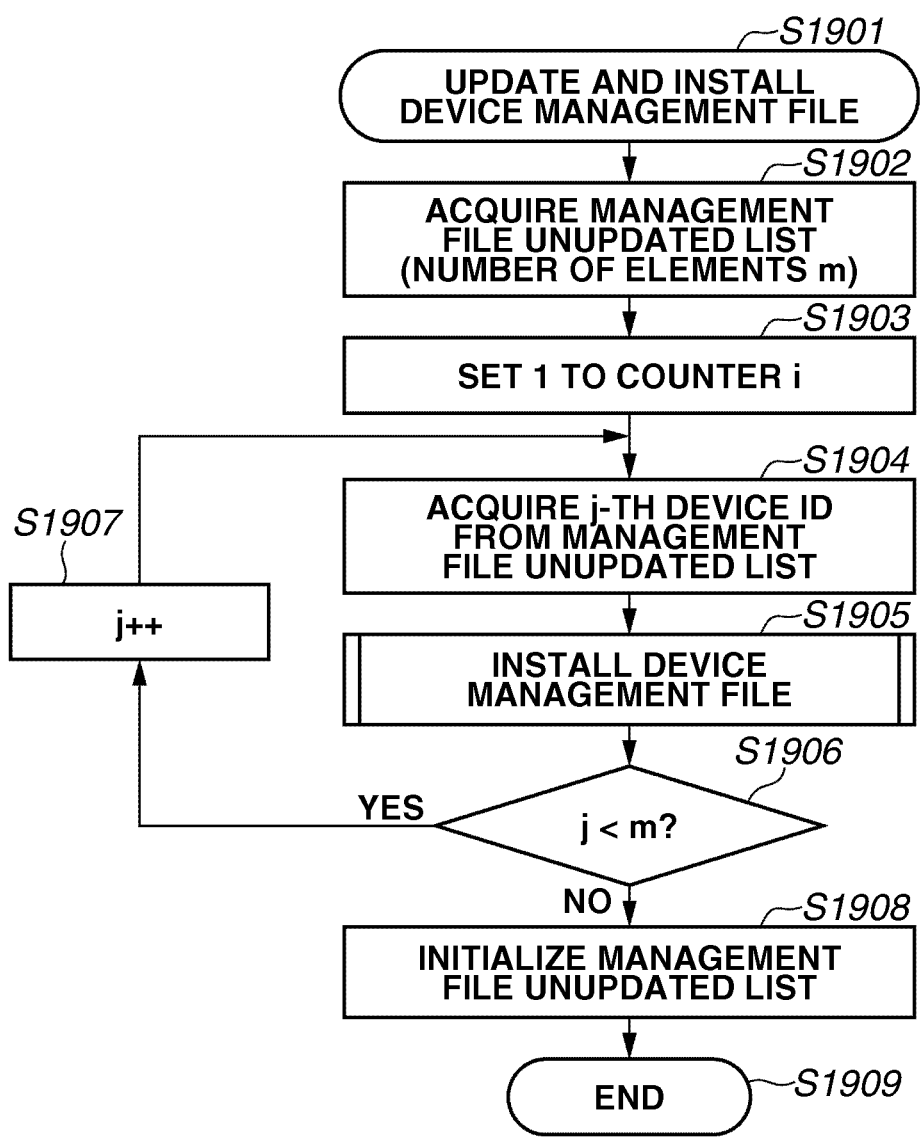

FIG. 15A is a flowchart illustrating processing for updating and installing the device management file. A program relating to the flow illustrated in FIG. 15A is stored in the HDD 202, and read to the RAM 201 to be executed by the CPU 204. When the device management 80 executes the processing for updating and installing the device management file in step S1614 illustrated in FIG. 12, in FIG. 15A, in step S1901, the device management 80 starts the processing for updating and installing the device management file.

In step S1902, the device management file 80 acquires a management file unupdated list, which is stored in a predetermined position of the HDD 202 of the PC1. In step S1903, the device management 80 sets 1 in a counter j created in the RAM 201 of the PC 1. In step S1904, the device management 80 acquires j-th (1st) device ID of the management file unupdated list. In step S1905, the device management 80 executes processing for installing a device management file described below referring to FIG. 16. When there is no more device ID to be processed in the management file unupdated list (NO in step S1906), the processing proceeds to step S1908. When there is more device ID to be processed (YES in step S1906), in step S1907, the device management 80 increments the counter j by 1, and the processing proceeds to step S1904. In step S1908, the device management 80 initializes the management file unupdated list. The processing then proceeds to step S1909 to end the processing for updating and installing the device management file.

Figure 16:
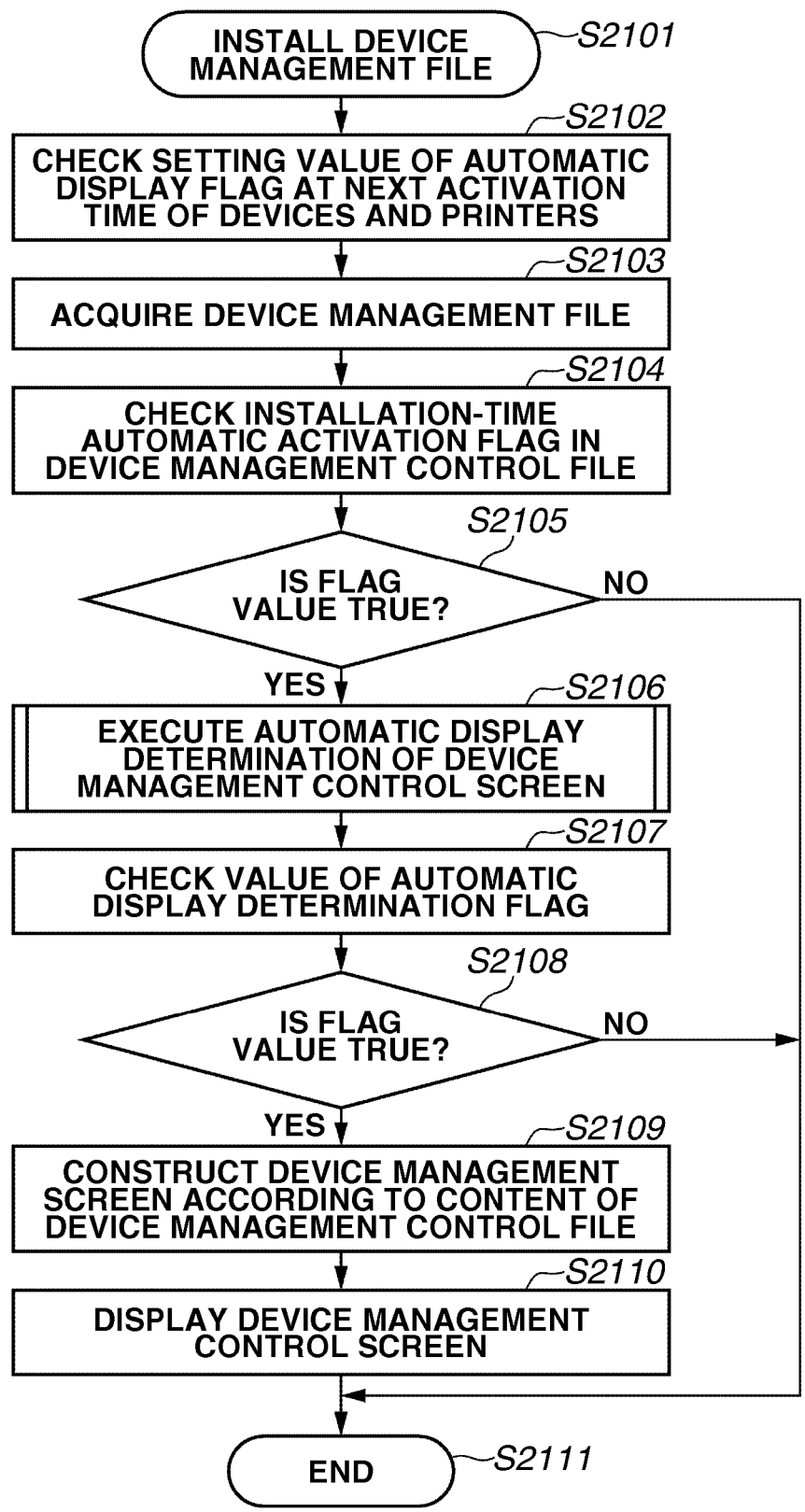
FIG. 16 is a flowchart illustrating processing for installing the device management file.

FIG. 16 is a flowchart illustrating processing for installing the device management file. A program relating to the flow illustrated in FIG. 16 is stored in the HDD 202, and read to the RAM 201 to be executed by the CPU 204. In a case where the processing for installing the device management file is executed by the device management 80 in step S1707 illustrated in FIG. 13 or in step S1905 illustrated in FIG. 15A, the device management 80 executes the processing for installing the device management file, in step S2101 in FIG. 16.

In step S2102, the device management 80 sets FALSE in the automatic display flag for next activation time of Devices and Printers, which is stored in the predetermined position of the HDD 202 of the PC 1, and the processing proceeds to step S2103. In step S2103, based on the device ID information checked in step S1702 illustrated in FIG. 13 or in step S1904 illustrated in FIG. 15A, the device management 80 acquires the device management control file 800 for the device (MFP 3) from the file storage unit 11 or 12 in the CD-ROM 10 inserted into the web server 9 or the PC 1 to store it in a predetermined position in the HDD 202 of the PC 1. In step S2104, the device management 80 checks a value set in the element 811 in the device management control file 800 acquired in step S2103. When the value set in the element 811 is TRUE (YES in step S2105), the processing proceeds to step S2106. When the value set in the element 811 is not TRUE (NO in step S2105), the processing proceeds to step S2111 to end the processing for installing the device management file.

In step S2106, the device management 80 executes processing for automatically displaying a device management control screen, which is described below referring to FIG. 17, and the processing proceeds to step S2107. In step S2107, the device management 80 checks a setting value of an automatic display determination flag stored in a predetermined position in the HDD 202 of the PC 1. When TRUE is set in the automatic display determination flag (YES in step S2108), the processing proceeds to step S2109. When TRUE is not set in the automatic display determination flag (NO in step S2108), the processing proceeds to step S2111 to end the processing for installing the device management file.

In step S2109, the device management 80 forms a device management screen according to a described content of the device management control file 800, and activates the device management screen in step S2110. Then, the processing proceeds to step S2111 to end the processing for installing the device management file.

Figure 17:
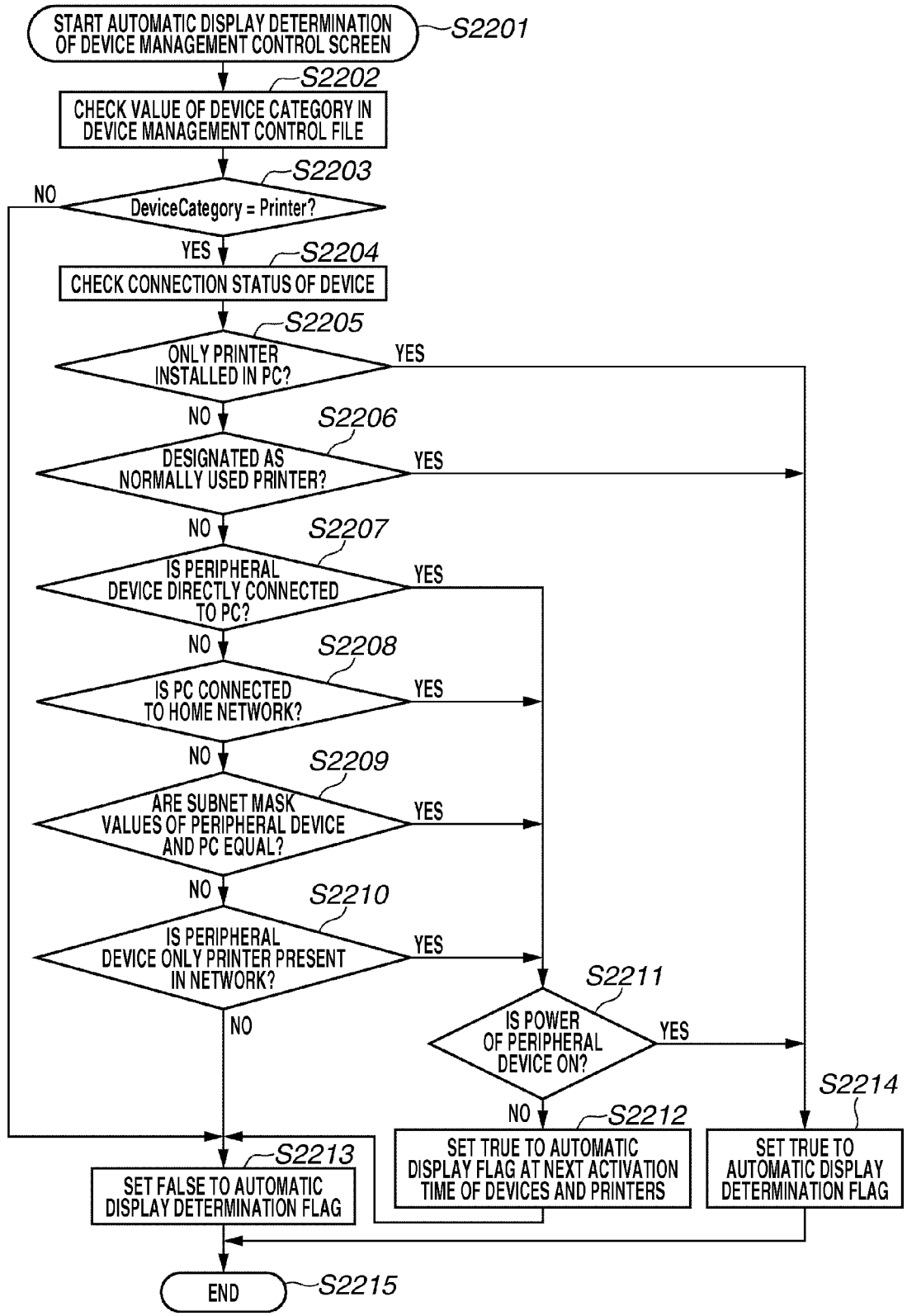
FIG. 17 is a flowchart illustrating processing for determining automatic display of a device management control screen.

FIG. 17 is a flowchart illustrating processing for determining automatic displaying of the device management control screen. A program relating to the flow illustrated in FIG. 17 is stored in the HDD 202, and read to the RAM 201 to be executed by the CPU 204. In a case where the device management 80 executes the processing for determining automatic displaying of the device management control screen in step S2106 illustrated in FIG. 16, in FIG. 17, in step S2201, the device management 80 starts the processing for determining automatic displaying of the device management control screen.

In step S2202, as to the device management control file 800 stored in the predetermined position in the HDD 202 of the PC 1, the device management 80 checks a value indicating category information of the device described in the element 813. When the value stored in the element 813 is a printer (YES in step S2203), the processing proceeds to step S2204. When the value stored in the element 813 is not a printer (NO in step S2203), the processing proceeds to step S2213.

In step S2204, the device management 80 checks a connection status of the peripheral device, and the processing proceeds to step S2205. In step S2205, the device management 80 checks whether the peripheral device (MFP 3) is the only printer installed in the PC 1. When the peripheral device (MFP 3) is the only printer installed in the PC 1 (YES in step S2205), the processing proceeds to step S2214. When the peripheral device is not the only printer installed in the PC 1 (NO in step S2205), the processing proceeds to step S2206 to check whether the peripheral device (MFP 3) is designated as a normally used printer. When the peripheral device (MFP 3) is designated as a normally used printer (YES in step S2206), the processing proceeds to step S2214. When the peripheral device is not designated as a normally used printer (NO in step S2206), the processing proceeds to step S2207 to check whether the peripheral device (MFP 3) is directly connected to the PC 1 via an interface such as the USB interface 14 or a Bluetooth interface (not illustrated).

When the peripheral device (MFP 3) is directly connected to the PC 1 (YES in step S2207), the processing proceeds to step S2211. When the peripheral device is not directly connected to the PC 1 (NO in step S2207), the processing proceeds to step S2208 to check whether the PC 1 is connected to a home network. When the PC 1 is connected to a home network (YES in step S2208), the processing proceeds to step S2211. When the PC 1 is not connected to a home network (NO in step S2208), the processing proceeds to step S2209 to check whether subnet masks of the peripheral device (MFP 3) and the PC 1 are similar.

When the subnet masks of the peripheral device (MFP 3) and the PC 1 are similar (YES in step S2209), the processing proceeds to step S2211. When the subnet masks of the peripheral device and the PC 1 are not similar (NO in step S2209), the processing proceeds to step S2210 to check whether the peripheral device (MFP 3) is the only printer present in the network. When the peripheral device (MFP 3) is the only printer present in the network (YES in step S2210), the processing proceeds to step S2211. When the peripheral device is not the only printer present in the network (NO in step S2210), the processing proceeds to step S2213.

In step S2211, the device management 80 checks a power state of the peripheral device (MFP 3) to check whether power is ON. When the power is ON in the peripheral device (MFP 3) (YES in step S2211), the processing proceeds to step S2214. When the power is not ON in the peripheral device (NO in step S2211), the processing proceeds to step S2212 to set TRUE in the automatic display flag for next activation time of Devices and Printers stored in the predetermined position in the HDD 202 of the PC 1. Then, the processing proceeds to step S2213.

In step S2213, the device management 80 sets FALSE to the automatic display determination flag stored in the predetermined position in the HDD 202 of the PC 1. The processing then proceeds to step S2215 to end the processing for determining automatic displaying of the device management control screen. In step S2214, the device management 80 sets TRUE in the automatic display determination flag stored in the predetermined position in the HDD 202 of the PC 1. The processing then proceeds to step S2215 to end the processing for determining automatic displaying of the device management control screen.

Figure 18A:
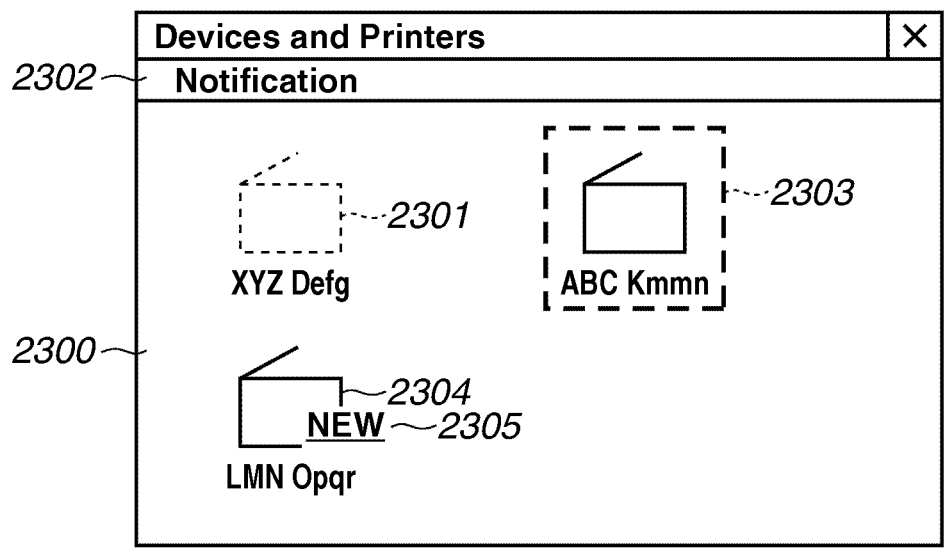
FIGS. 18A and 18B illustrate a Devices and Printers folder and a selection screen for device management file updating and installing target device.

According to a third exemplary embodiment, by processing illustrated in FIG. 15B described below and screens illustrated in FIGS. 18A and 18B described below, a user can be notified of a peripheral device targeted to install a device management file. FIG. 18A illustrates a Devices and Printers folder and a device management screen. In FIG. 18A, the Devices and Printers folder 2300 is displayed on a PC 1, and a printer or a FAX usable in the PC 1 is displayed for each driver in the folder. In this embodiment, a peripheral device 2301 named XYZ Defg, a peripheral device 2303 named ABC Kmmn, and a peripheral device 2304 named LMN Opqr are displayed as usable peripheral devices.

In the Devices and Printers folder 2300, the peripheral device 2301 having an icon indicated by a dotted line is unusable, while the peripheral device 2303 and the peripheral device 2304 indicated by solid lines are usable. NEW 2305 displayed on the peripheral device 2304 indicates that a new device management file for the peripheral device 2304 has been installed.

An area 2302 is a region for displaying a notification relating to the Devices and Printers folder 2300. For example, as to one or more peripheral devices (device 1) among the peripheral devices displayed in the Devices and Printers folder 2300, when a device management file for the peripheral device 1 which is newer than the device management file for the peripheral device 1 present in a device management file storage unit 905 is present in a PC 2 or a CD-ROM 10, a notification indicating permission of acquiring the new device management file for the peripheral device 1 is displayed in this area. When there is no content for the notification, nothing is displayed in the area.

Figure 18B:
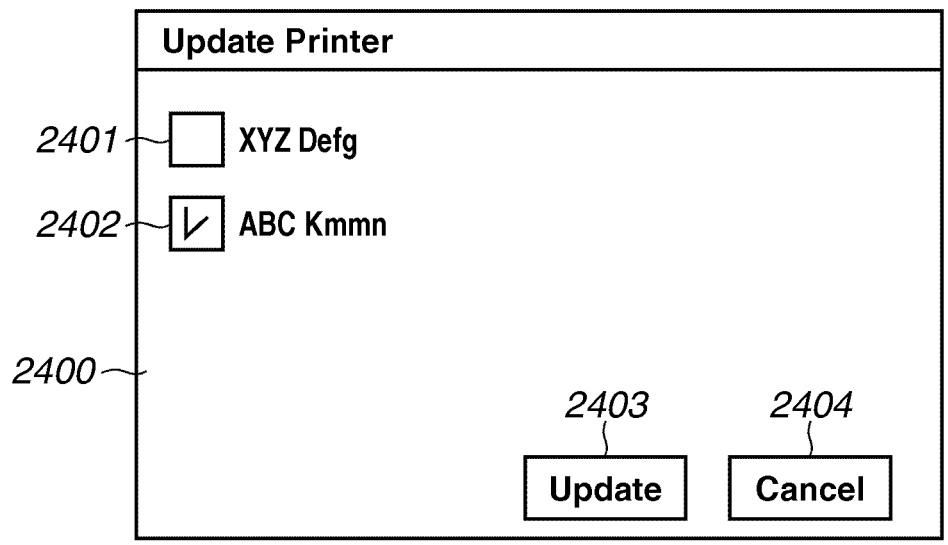

FIG. 18B illustrates a selection screen for a device management file updating and installing target device. The selection screen is displayed on the PC 1 when permission of acquiring a new device management file for one or more peripheral devices among the peripheral devices displayed in 2303 and 2300 illustrated in FIG. 18A is notified, and the device management 80 executes updating and installing of the device management file according to a content of the notification.

In FIG. 18B, a screen 2400 is a screen for displaying a list of peripheral devices for which a new device management file can be acquired. Device names 2401 and 2402 for which a new device management file can be acquired have check boxes for selecting whether to acquire a new device management file. A button 2403 is a button for acquiring a new device management file. When the button 2403 is pressed, processing for acquiring a new device management file in 2401 and 2402 is executed. A button 2404 is a button for canceling the processing for acquiring the new device management file. When the button 2404 is pressed, the processing for acquiring the new device management file is canceled.

FIG. 15B is a flowchart illustrating processing for updating and installing the device management file. A program relating to the flow illustrated in FIG. 15B is stored in the HDD 202, and read to the RAM 201 to be executed by the CPU 204. In a case where the device management 80 executes the processing for updating and installing the device management file in step S1614 illustrated in FIG. 12, the device management 80 starts the processing for updating and installing the device management file, in step S2001 in FIG. 15B.

In step S2002, the device management file 80 acquires the management file unupdated list stored in the predetermined position of the HDD 202 of the PC 1. Based on device ID described in the management file unupdated list, the device management 80 forms a selection screen 2400 for a device management file updating and installing target device to be displayed in the PC 1. When a device management file updating and installing target device is selected on the selection screen 2400 for the device management file updating and installing target device and the button 2403 is pressed, in step S2004, based on information of the device selected by the user in step S2003, the device management 80 creates an updating and installing target device list.

In step S2005, the device management 80 sets 1 in a counter j created in the RAM 201 of the PC 1. In step S2006, the device management 80 acquires j-th (1st) device ID of the updating and installing target device list. In step S2007, the device management 80 executes processing for installing the device management file illustrated in FIG. 16. When there is no more device ID to be processed in the updating and installing target device list (NO in step S2008), the processing proceeds to step S2010. When there is more device ID to be processed (YES in step S2008), in step S2009, the device management 80 increments the counter j by 1, and the processing proceeds to step S2006.

In step S2010, the device management 80 initializes the management file unupdated list. The processing then proceeds to step S2011. In step S2011, the device management 80 initializes the updating and installing target device list. The processing then proceeds to step S2012 to end the processing for updating and installing the device management file.

Other Embodiments

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium). In an example, a computer-readable storage medium may store a program that causes an image forming apparatus to perform a method described herein. In another example, a central processing unit (CPU) may be configured to control at least one unit utilized in a method or apparatus described herein.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-075375 filed Mar. 30, 2011, which is hereby incorporated by reference herein in its entirety.

What is claimed is:

1. An information processing apparatus for displaying a peripheral device management screen to manage a peripheral device, the information processing apparatus comprising:
   a storage unit configured to store, in a storage part, peripheral device management information in which information to instruct execution of at least one processing relating to the peripheral device from the peripheral device management screen is defined;
   a management screen forming unit configured to determine a configuration and a content of the peripheral device management screen based on the information defined in the peripheral device management information;
   an installation determination unit configured to determine whether to install the peripheral device management information;
   a display determination unit configured to determine whether to automatically display the peripheral device management screen in response to the peripheral device management information being installed based on an installation determination result of the installation determination unit; and
   a display control unit configured to execute control to display the peripheral device management screen based on a display determination result of the display determination unit,
   wherein the display control unit executes control to display, in response to a plurality of pieces of peripheral device management information corresponding to a plurality of peripheral devices being simultaneously updated, a peripheral device management screen corresponding to a specific peripheral device among the plurality of peripheral devices while executing control not to display any peripheral device management screens corresponding to peripheral devices among the plurality of peripheral devices other than the specific peripheral device.

2. The information processing apparatus according to claim 1, wherein the installation determination unit determines whether to install the peripheral management information by checking device unique information described in each peripheral device management information stored in the storage part or checking update or non-update information in another storage area about whether to update.

3. The information processing apparatus according to claim 1, wherein the peripheral device management information includes a static text file, and contains automatic launch setting information indicating whether to automatically display the peripheral device management screen.

4. The information processing apparatus according to claim 1, wherein the management screen forming unit determines a content to be displayed on the peripheral device management screen and a configuration thereof according to the information defined in the stored peripheral device management information, information recorded in the information processing apparatus, and a status of the peripheral device.

5. The information processing apparatus according to claim 1, wherein the display control unit determines the specific peripheral device by checking whether the peripheral device is designated as a normally used device.

6. The information processing apparatus according to claim 1, wherein the display control unit determines the specific peripheral device by checking a form of connection with the peripheral device.

7. A method for managing a peripheral device in an information processing apparatus that displays a peripheral device management screen to manage the peripheral device, the method comprising:

storing, in a storage part, peripheral device management information in which information to instruct execution of at least one processing relating to the peripheral device from the peripheral device management screen is defined;

determining a configuration and a content of the peripheral device management screen based on the information defined in the peripheral device management information;

determining whether to install the peripheral device management information;

determining whether to automatically display the peripheral device management screen in response to the peripheral device management information being installed based on an installation determination result; and executing display control to display the peripheral device management screen based on a display determination result, wherein executing display control includes executing control to display, in response to a plurality of pieces of peripheral device management information corresponding to a plurality of peripheral devices being simultaneously updated, a peripheral device management screen corresponding to a specific peripheral device among the plurality of peripheral devices while executing control not to display any peripheral device management screens corresponding to peripheral devices among the plurality of peripheral devices other than the specific peripheral device.

8. A non-transitory computer-readable storage medium storing a program that causes an information processing apparatus to perform the method according to claim 7.

* * * * *